US009264099B1

(12) United States Patent
Sapio et al.

(10) Patent No.: US 9,264,099 B1
(45) Date of Patent: Feb. 16, 2016

(54) FREQUENCY-BLOCK HOPPING

(71) Applicant: Link Labs, LLC, Annapolis, MD (US)

(72) Inventors: Adrian Sapio, Mount Airy, MD (US); Richard Kevin Sawyer, Jr., University Park, MD (US)

(73) Assignee: Link Labs, INC., Annapolis, MD (US)

( * ) Notice: Subject to any disclaimer, the term of this patent is extended or adjusted under 35 U.S.C. 154(b) by 0 days.

(21) Appl. No.: 14/728,411

(22) Filed: Jun. 2, 2015

(51) Int. Cl.
*H04B 1/713* (2011.01)
*H04B 1/7156* (2011.01)
*H04B 1/69* (2011.01)

(52) U.S. Cl.
CPC ...... *H04B 1/7156* (2013.01); *H04B 2001/6912* (2013.01)

(58) Field of Classification Search
CPC .... H04B 1/713; H04B 1/7136; H04B 1/7143; H04B 2001/713; H04B 2001/7136; H04B 2001/7156; H04B 2201/713
USPC ............ 375/132, 133, 135, 136, 259; 370/395.3, 400, 401, 408, 411, 470, 370/472; 455/424, 425, 426.1, 462.2
See application file for complete search history.

(56) References Cited

U.S. PATENT DOCUMENTS

| 5,581,548 | A * | 12/1996 | Ugland et al. ............... 370/330 |
| 7,791,415 | B2 | 9/2010 | Hornbuckle |
| 7,990,928 | B2 | 8/2011 | Kwon et al. |
| 8,060,099 | B2 | 11/2011 | Julian et al. |
| 8,374,212 | B2 | 2/2013 | Gharbit et al. |
| 8,755,770 | B2 | 6/2014 | Haverty |
| 8,855,064 | B2 | 10/2014 | Malladi et al. |
| 2007/0211667 | A1 * | 9/2007 | Agrawal et al. ............... 370/335 |
| 2010/0142461 | A1 * | 6/2010 | Miki et al. ............... 370/329 |
| 2011/0026642 | A1 * | 2/2011 | Kawamura et al. .......... 375/316 |
| 2011/0092240 | A1 * | 4/2011 | Aiba et al. ............... 455/509 |
| 2011/0235597 | A1 | 9/2011 | Montojo et al. |
| 2013/0051383 | A1 * | 2/2013 | Hakola et al. ............... 370/350 |

OTHER PUBLICATIONS

"LoRAWAN 1.0," Stale Pettersen, Jan. 26, 2015, four (4) pages, URL=https://www.linkedin.com/pulse/lorawan-10-st%C3%A5le-pettersen.
"Frequency Block Hopping in the Uplink of OFDM-based Wireless Systems," Kim, Cheong-Hwan et al., School of Elec. Eng. and INMC, Seoul Nat, University, 4 pgs, Oct. 2007, URL=http://s-space.snu.ac.kr/bitstream/10371/7015/1/KSPC07_%EA%B9%80%EC%A0%95%ED%99%98_Frequency%20Block%20Hopping%20in%20the%20Uplink%20-of%20OFDM%20Based%20Wireless%20Systems.pdf.

* cited by examiner

*Primary Examiner* — Young T Tse
(74) *Attorney, Agent, or Firm* — Charles B. Lobsenz; Thomas S. Auchterlonie; Symbus Law Group, LLC

(57) ABSTRACT

A method (of operating an end node) includes: wirelessly receiving an instance of a non-hopping beacon signal, B, periodically-transmitted from a central node; interpreting a frequency-block hopping guide (FBHG) according to FN(i) and IDCN thereby to determine a corresponding set, CSET (i), of at least two channels available to the end node for transmission, respectively, during frame FN(i); selecting, at least pseudo-randomly, at least one channel amongst the set CSET(i); and wirelessly transmitting at least one message from the end node using the at least one selected channel, respectively. Each instance B(i) includes: a corresponding frame number, FN(i); and an identification, IDCN, of the central node. The FBHG establishes: a total of L frames; a set of channels CSET for each frame, respectively; and that, for any two consecutive ones of the L frames, FN(j) and FN(j+1), the corresponding sets CSET(j) and CSET(j+1) will be different, CSET(j)≠CSET(j+1).

30 Claims, 11 Drawing Sheets

Examples:
map(035) = 64
map(074) = 49
map(175) = 110
map(219) = 112

| FN, Frame# | CH, Channel# | FN, Frame# | CH, Channel# | FN, Frame# | CH, Channel# | FN, Frame# | CH, Channel# | FN, Frame# | CH, Channel# | FN, Frame# | CH, Channel# | FN, Frame# | CH, Channel# | FN, Frame# | CH, Channel# |
|---|---|---|---|---|---|---|---|---|---|---|---|---|---|---|---|
| 000 | 61 | 032 | 25 | 064 | 142 | 096 | 68 | 128 | 117 | 160 | 14 | 192 | 14 | 224 | 106 |
| 001 | 51 | 033 | 94 | 065 | 59 | 097 | 9 | 129 | 66 | 161 | 87 | 193 | 67 | 225 | 87 |
| 002 | 64 | 034 | 147 | 066 | 89 | 098 | 58 | 130 | 4 | 162 | 100 | 194 | 84 | 226 | 72 |
| 003 | 49 | 035 | 64 | 067 | 118 | 099 | 99 | 131 | 125 | 163 | 113 | 195 | 117 | 227 | 145 |
| 004 | 142 | 036 | 125 | 068 | 75 | 100 | 116 | 132 | 118 | 164 | 22 | 196 | 122 | 228 | 122 |
| 005 | 99 | 037 | 10 | 069 | 24 | 101 | 33 | 133 | 27 | 165 | 99 | 197 | 55 | 229 | 91 |
| 006 | 64 | 038 | 59 | 070 | 109 | 102 | 118 | 134 | 72 | 166 | 4 | 198 | 20 | 230 | 84 |
| 007 | 97 | 039 | 96 | 071 | 114 | 103 | 67 | 135 | 5 | 167 | 42 | 199 | 125 | 231 | 25 |
| 008 | 50 | 040 | 145 | 072 | 79 | 104 | 45 | 136 | 14 | 168 | 59 | 200 | 70 | 232 | 78 |
| 009 | 3 | 041 | 110 | 073 | 16 | 105 | 74 | 137 | 95 | 169 | 100 | 201 | 111 | 233 | 143 |
| 010 | 60 | 042 | 55 | 074 | 49 | 106 | 139 | 138 | 104 | 170 | 13 | 202 | 128 | 234 | 8 |
| 011 | 37 | 043 | 36 | 075 | 122 | 107 | 64 | 139 | 97 | 171 | 22 | 203 | 95 | 235 | 137 |
| 012 | 46 | 044 | 57 | 076 | 51 | 108 | 37 | 140 | 2 | 172 | 11 | 204 | 12 | 236 | 34 |
| 013 | 111 | 045 | 34 | 077 | 8 | 109 | 14 | 141 | 111 | 173 | 144 | 205 | 81 | 237 | 107 |
| 014 | 100 | 046 | 123 | 078 | 137 | 110 | 131 | 142 | 28 | 174 | 129 | 206 | 34 | 238 | 76 |
| 015 | 17 | 047 | 12 | 079 | 122 | 111 | 120 | 143 | 125 | 175 | 110 | 207 | 39 | 239 | 65 |
| 016 | 2 | 048 | 73 | 080 | 19 | 112 | 141 | 144 | 86 | 176 | 39 | 208 | 132 | 240 | 18 |
| 017 | 139 | 049 | 126 | 081 | 64 | 113 | 122 | 145 | 71 | 177 | 101 | 209 | 110 | 241 | 55 |
| 018 | 96 | 050 | 99 | 082 | 101 | 114 | 23 | 146 | 52 | 178 | 115 | 210 | 43 | 242 | 4 |
| 019 | 77 | 051 | 44 | 083 | 70 | 115 | 56 | 147 | 9 | 179 | 64 | 211 | 88 | 243 | 69 |
| 020 | 138 | 052 | 89 | 084 | 55 | 116 | 61 | 148 | 118 | 180 | 102 | 212 | 13 | 244 | 146 |
| 021 | 88 | 053 | 142 | 085 | 85 | 117 | 142 | 149 | 131 | 181 | 59 | 213 | 130 | 245 | 79 |
| 022 | 1 | 054 | 123 | 086 | 50 | 118 | 67 | 150 | 100 | 182 | 72 | 214 | 95 | 246 | 20 |
| 023 | 134 | 055 | 8 | 087 | 35 | 119 | 76 | 151 | 57 | 183 | 21 | 215 | 64 | 247 | 45 |
| 024 | 7 | 056 | 57 | 088 | 116 | 120 | 93 | 152 | 114 | 184 | 134 | 216 | 85 | 248 | 58 |
| 025 | 73 | 057 | 90 | 089 | 121 | 121 | 138 | 153 | 131 | 185 | 147 | 217 | 14 | 249 | 15 |
| 026 | 134 | 058 | 35 | 090 | 142 | 122 | 119 | 154 | 116 | 186 | 72 | 218 | 7 | 250 | 100 |
| 027 | 95 | 059 | 144 | 091 | 115 | 123 | 132 | 155 | 29 | 187 | 49 | 219 | 112 | 251 | 117 |
| 028 | 32 | 060 | 5 | 092 | 124 | 124 | 85 | 156 | 82 | 188 | 142 | 220 | 146 | 252 | 102 |
| 029 | 109 | 061 | 62 | 093 | 1 | 125 | 54 | 157 | 115 | 189 | 71 | 221 | 91 | 253 | 123 |
| 030 | 127 | 062 | 147 | 094 | 14 | 126 | 123 | 158 | 88 | 190 | 132 | 222 | 28 | 254 | 4 |
| 031 | 92 | 063 | 137 | 095 | 27 | 127 | 8 | 159 | 65 | 191 | 29 | 223 | 41 | 255 | 21 |

410

FIG. 5A
(Hopping Block Map)

FIG. 5B (Hopping Block Schedule)

FREQUENCY-BLOCK HOPPING

FIELD OF THE DISCLOSURE

Embodiments of the present invention relate to methods and apparatus for operating one of a plurality of end nodes to wirelessly communicate with a central node over an unlicensed spectrum, and for operating a central node to wirelessly communicate with instances of the end node over the unlicensed spectrum.

BACKGROUND

Circa 2009, the Internet was in a stage of its evolution in which the backbone (routers and servers) was connected to fringe nodes formed primarily by personal computers. At that time, Kevin Ashton (among others) looked ahead to the next stage in the Internet's evolution, which he described as the Internet of Things ("IoT"). In his article, "That 'Internet of Things' Thing," *RFID Journal*, Jul. 22, 2009, he describes the circa-2009-Internet as almost wholly dependent upon human interaction, i.e., he asserts that nearly all of the data then available on the internet was generated by data-capture/data-creation chains of events each of which included human interaction, e.g., typing, pressing a record button, taking a digital picture, or scanning a bar code. In the evolution of the Internet, such dependence upon human interaction as a link in each chain of data-capture and/or data-generation is a bottleneck. To deal with the bottleneck, Ashton suggested adapting internet-connected computers by providing them with data-capture and/or data-generation capability, thereby eliminating human interaction from a substantial portion of the data-capture/data-creation chains of events.

In the context of the IoT, a thing can be a natural or man-made object to which is assigned a unique ID/address and which is configured with the ability to capture and/or create data and transfer that data over a network. Relative to the IoT, a thing can be, e.g., a person with a heart monitor implant, a farm animal with a biochip transponder, an automobile that has built-in sensors to alert the driver when tire pressure is low, field operation devices that assist fire-fighters in search and rescue, personal biometric monitors woven into clothing that interact with thermostat systems and lighting systems to control HVAC and illumination conditions in a room continuously and imperceptibly, a refrigerator that is "aware" of its suitably tagged contents that can both plan a variety of menus from the food actually present therein and warn users of stale or spoiled food, etc.

In the post-2009 evolution of the Internet towards the IoT, a segment that has experienced major growth is that of small, inexpensive, networked processing devices, distributed at all scales throughout everyday life. Of those, many are configured for everyday/commonplace purposes. For the IoT, the fringe nodes will be comprised substantially of such small devices.

Within the small-device segment, the sub-segment that has the greatest growth potential is embedded, low-power, wireless devices. Examples of low-power, low-bandwidth wireless networks include those compliant with the IEEE 802.15.4 standard, the "Zigbee protocol," the 6LoWPAN standard, the LoRaWAN standard (as standardized by the LoRa™ Alliance), etc. Such networks are described as comprising the Wireless Embedded Internet ("WET"), which is a subset of IoT.

Most of the WET operates in portions of the RF spectrum that are unlicensed by a government's regulatory authority. Examples of unlicensed spectrums include the industrial, scientific and medical (ISM) radio bands reserved internationally for the use of radio frequency (RF) energy for industrial, scientific and medical purposes other than telecommunications, e.g., as regulated in the U.S.A. by FCC Part 15, with such regulations including requirements/constraints on frequency hopping, etc. An example of a telecommunications technique used in the 915 MHz ISM band is the LoRa™ modulation format that is included in the LoRaWAN standard. The LoRa™ modulation format can be described as a frequency modulated ("FM") chirp that is based on the generation of a stable chirp using a fractional-N ("fracN") phase-locked loop ("PLL"). Core LoRa™ technology is described in U.S. Pat. No. 7,791,415, which is assigned to Semtech™ Corporation. It is noted that the LoRa™ modulation format does not itself describe system functionality above the physical layer, i.e., above the RF medium.

It was assumed that Moore's law would advance computing and communication capabilities so rapidly that soon any embedded device could implement IP protocols, even the embedded, low-power, wireless devices of the WET. Alas, this has not proven true for cheap, low-power microcontrollers and low-power wireless radio technologies. The vast majority of simple embedded devices still make use of 8-bit and 16-bit microcontrollers with very limited memory because they are low-power, small and cheap.

For operation in the unlicensed spectrum, there are two conventional hopping schemes. It is assumed that a maximum of Q channels can be used for uplink (transmission from an end node to a central node).

In the first conventional hopping scheme, there is no hopping synchronization between the central node and the end nodes. Accordingly, the first conventional hopping scheme can be described as a zero hopping-synchronization scheme. For the first conventional hopping scheme, because the central node does not know over which of the Q uplink channels the end nodes will transmit uplink messages, the central node must listen for a transmission on each of the Q uplink channels during each frame. Arrangements in which 'all-channel listening' has been implemented include: an all-physical arrangement in which the central node is provided with Q physical receivers so that the central node can listen concurrently on all Q uplink channels; and a partly-physical/partly-virtual arrangement in which the central node is provided with X physical receivers, where X is an integer and $1 \leq X \leq Q$. Under either arrangement, there is zero hopping synchronization, Under the partly-physical/partly-virtual arrangement, the central node is provided with a buffer to record all transmissions (if any) with a given frame. Each of the X physical receivers is allotted a fraction Q/X of the Q uplink channels. For a given frame and for each of the X physical receivers, the following process is iterated over d where d is an integer and $0 \leq d \leq (Q/X-1)$: a given physical receiver is tuned to one of the channels CH(d) in its allotment of Q/N uplink channels and then listens the corresponding recording for a transmission on CH(d). Under the case where where X=1, the allotment is Q/X=Q such that the iterative process is iterated Q times.

In the second conventional hopping scheme: it is further assumed that there are V end nodes, where V is an integer and $2 \leq V$. Accordingly, for the second conventional hopping scheme, the central node is provided with V receivers because there are V end nodes such that there is one receiver for each end node. To ensure synchronization for the second hopping scheme, each of the V pairings of the central node with one of the V end nodes is provided with its own hopping plan, respectively, such that there are V distinct hopping plans. The second conventional hopping scheme can be described as a complete hopping-synchronization scheme.

SUMMARY

It is to be understood that both the following summary and the detailed description are exemplary and explanatory and are intended to provide further explanation of the present invention as claimed. Neither the summary nor the description that follows is intended to define or limit the scope of the present invention to the particular features mentioned in the summary or in the description. Rather, the scope of the present invention is defined by the appended claims.

In certain embodiments, the disclosed embodiments may include one or more of the features described herein.

An aspect of the present invention provides a method of operating one of a plurality of end nodes to communicate with a central node over an unlicensed spectrum, the method comprising receiving, interpreting, selecting and wirelessly transmitting. In particular, the receiving includes wirelessly receiving, an instance of a non-hopping beacon signal, B, periodically-transmitted from the central node. Each instance B(i) of the beacon signal includes: a frame number, FN(i), of a frame corresponding thereto; and an identification, IDCN, of the central node. In particular, the interpreting includes interpreting a frequency-block hopping guide according to FN(i) and IDCN thereby to determine a corresponding set, CSET(i), of at least two channels available to the end node for transmission thereover, respectively, during frame FN(i). The frequency-block hopping guide establishes: a total of L frames; a set of channels CSET for each frame, respectively; and that, for any two consecutive ones of the L frames, FN(j) and FN(j+1), the corresponding sets CSET(j) and CSET(j+1) will be different, CSET(j)≠CSET(j+1). In particular, the selecting includes selecting, at least pseudo-randomly, at least one channel amongst the set CSET(i). In particular, the wirelessly transmitting includes wirelessly transmitting at least one message from the end node using the at least one selected channel, respectively. It is noted that i and j are non-negative integers, L is an integer and 2≤L.

Another aspect of the present invention provides an end node configured to communicate with a central node over an unlicensed spectrum. Such an end node comprises: a wireless unit; a wireless interface; an interpreter; a channel selector; and a message generator. The wireless unit is configured to receive and transmit messages, respectively. The wireless interface is configured to receive, via the wireless unit, an instance of a non-hopping beacon signal, B, periodically-transmitted from the central node. Each instance B(i) of the beacon signal includes: a frame number, FN(i), of a frame corresponding thereto; and an identification, IDCN, of the central node. The interpreter is configured to interpret a frequency-block hopping guide according to FN(i) and IDCN thereby to determine a corresponding set, CSET(i), of at least two channels available to the end node for transmission thereover during fame FN(i), respectively. The frequency-block hopping guide establishes: a total of L frames; a set of channels CSET for each frame, respectively; and that, for any two consecutive ones of the L frames, FN(j) and FN(j+1), the corresponding sets CSET(j) and CSET(j+1) will be different, CSET(j)≠CSET(j+1). The channel selector is configured to select, at least pseudo-randomly, at least one channel amongst the set CSET(i). The message generator is configured to generate at least one message using the at least one selected channel, respectively. Also, the wireless interface is further configured at least to transmit, via the wireless unit, at least one message using the at least one selected channel, respectively. It is noted that i and j are non-negative integers, L is an integer and 2≤L.

Yet another aspect of the present invention provides a method of operating a central node to wirelessly communicate with instances of an end node, the method comprising: determining; generating; transmitting, interpreting; and listening. The determining includes determining a frame number, FN(i). The generating includes generating periodically an instance, B(i), of a non-hopping beacon signal which includes: the frame number, FN(i); and an identification, IDCN, of the central node. The transmitting includes transmitting the instance B(i) of the beacon signal to the instances of the end node thereby starting an elapse of time corresponding to frame FN(i). The interpreting includes interpreting a frequency-block hopping guide according to FN(i) and IDCN thereby to determine a corresponding set, CSET(i), of at least two channels available to the instances of the end node for transmission thereover, respectively, during frame FN(i). The frequency-block hopping guide establishes: a total of L frames; a set of channels CSET for each frame, respectively; and that, for any two consecutive ones of the L frames, FN(j) and FN(j+1), the corresponding sets CSET(j) and CSET(j+1) will be different, CSET(j)≠CSET(j+1). The listening includes listening, during frame FN(i), on each of the at least two channels in the set CSET(i) for one or more transmissions from instances of the end nodes, respectively. It is noted that i and j are non-negative integers, L is an integer and 2≤L.

Yet another aspect of the present invention provides a central node configured to wirelessly communicate with instances of an end node, the central node comprising: a frame tracker; a beacon-signal generator; a wireless unit; a wireless interface; and an interpreter. The frame tracker is configured to determine a frame number, FN(i). The beacon-signal generator is configured to generate periodically an instance, B(i), of a non-hopping beacon signal which includes: the frame number, FN(i); and an identification, IDCN, of the central node. The wireless unit is configured to receive and transmit messages, respectively. The wireless interface is configured to transmit, via the wireless unit, the instance B(i) of the beacon signal to the instances of the end node thereby starting an elapse of time corresponding to frame FN(i). The interpreter is configured to interpret a frequency-block hopping guide according to FN(i) and IDCN thereby to determine a corresponding set, CSET(i), of at least two channels available to the instances of the end node for transmission thereover, respectively, during frame FN(i). The frequency-block hopping guide establishes: at total of L frames; a set of channels CSET for each frame, respectively; and that, for any two consecutive ones of the L frames, FN(j) and FN(j+1), the corresponding sets CSET(j) and CSET(j+1) will be different, CSET(j)≠CSET(j+1). The wireless interface is further configured at least to listen via the at least two receivers, during frame FN(i), on each of the at least two channels in the set CSET(i) for one or more transmissions from instances of the end nodes, respectively. It is noted that i and j are non-negative integers, L is an integer and 2≠L.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. Embodiments of the present invention will be more particularly described in conjunction with the following drawings wherein:

FIG. 5A is a particular implementation example of a frequency-block hopping map (which itself is a species of a frequency-block hopping guide), according to an embodiment of the present invention;

FIG. 5B is a particular implementation example of frequency-block hopping schedule (which itself is a species of a frequency-block hopping guide), according to an embodiment of the present invention;

DETAILED DESCRIPTION

Figure 1A:
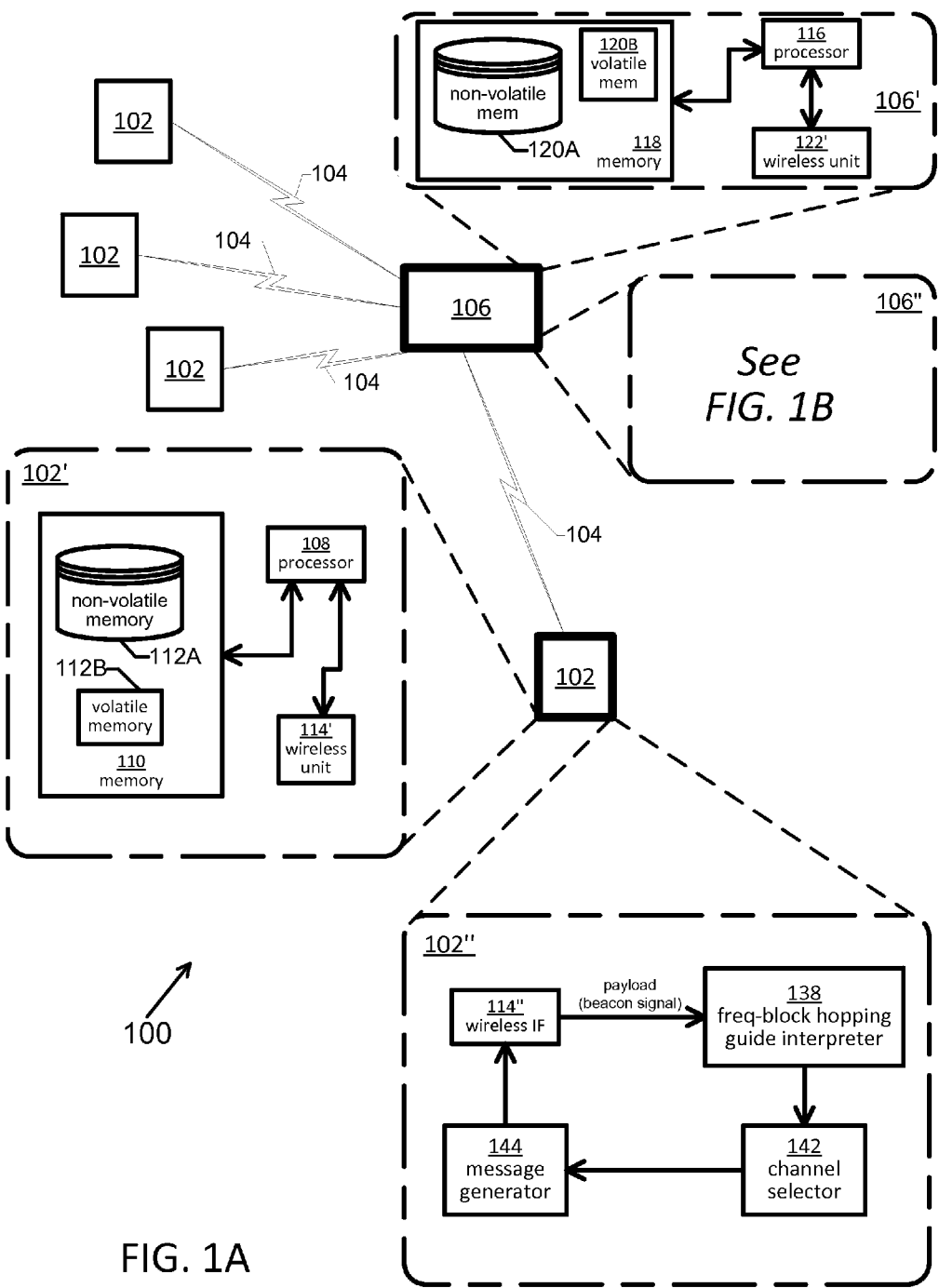
FIG. 1A is a block diagram of a wireless network, for example, a long-range, low-power network, according to an embodiment of the present invention, wherein FIG. 1A emphasizes physical unit and functional unit configurations.

Embodiments of the present invention will now be disclosed in terms of various exemplary embodiments. This specification discloses one or more embodiments that incorporate features of the present invention. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. The skilled artisan will appreciate that a particular feature, structure, or characteristic described in connection with one embodiment is not necessarily limited to that embodiment but typically has relevance and applicability to one or more other embodiments.

In the several figures, like reference numerals may be used for like elements having like functions even in different drawings. The embodiments described, and their detailed construction and elements, are merely provided to assist in a comprehensive understanding of the present invention. Thus, it is apparent that the present invention can be carried out in a variety of ways, and does not require any of the specific features described herein. Also, well-known functions or constructions are not described in detail since they would obscure the present invention with unnecessary detail.

The description is not to be taken in a limiting sense, but is made merely for the purpose of illustrating the general principles of the present invention, since the scope of the present invention is best defined by the appended claims.

It should also be noted that in some alternative implementations, the blocks in a flowchart, the communications in a sequence-diagram, the states in a state-diagram, etc., may occur out of the orders illustrated in the figures. That is, the illustrated orders of the blocks/communications/states are not intended to be limiting. Rather, the illustrated blocks/communications/states may be reordered into any suitable order, and some of the blocks/communications/states could occur simultaneously.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

The word "exemplary" is used herein to mean "serving as an example, instance, or illustration." Any embodiment described herein as "exemplary" is not necessarily to be construed as preferred or advantageous over other embodiments. Additionally, all embodiments described herein should be considered exemplary unless otherwise stated.

The word "network" is used herein to mean one or more conventional or proprietary networks using an appropriate network data transmission protocol. Examples of such networks include, PSTN, LAN, WAN, WiFi, WiMax, Internet, World Wide Web, Ethernet, other wireless networks, and the like.

The phrase "wireless device" is used herein to mean one or more conventional or proprietary devices using radio frequency transmission techniques. Examples of such wireless devices include cellular telephones, desktop computers, laptop computers, handheld computers, electronic games, portable digital assistants, MP3 players, DVD players, or the like.

In developing embodiments of the present invention, among other things, one or more of the inventors thereof:
realized, regarding operation in an unlicensed spectrum according to the first conventional hopping scheme (also described as a zero hopping-synchronization scheme), that:
relative to the partly-physical/partly-virtual arrangement, the all-physical arrangement does not require the buffer and is faster because the iterative process is not needed, but is more expensive because it requires Q physical receivers, one for each of the Q uplink channels;
relative to the all-physical arrangement, the partly-physical/partly-virtual arrangement is less expensive because it requires only X physical receivers, where X is an integer and $1 \leq X \leq Q$, but it is slower because of the above-noted iterative process used to listen across the Q uplink channels;
any simplicity benefit of the central node not having to be hopping-synchronized with the end nodes is outweighed by the disadvantage (under either the all-physical arrangement or the partly-physical/partly-virtual arrangement) of having to provide Q discrete instances of tuning a physical receiver to a channel for each frame (which is more costly at least in terms of hardware under the all-physical arrangement and which is more costly at least in terms of complexity and slower performance under the partly-physical/partly-virtual arrangement);
realized, regarding operation in an unlicensed spectrum according to the second conventional hopping scheme (also described as a complete hopping-synchronization scheme), that any cost savings (relative to the first conventional hopping scheme) of only having to provide the central node with V receivers (corresponding to the number V of end nodes) is negated by the increased synchronizing complexity and operational overhead associated with having to provide each of the V pairings of the central node and the V end nodes with its own hopping plan, respectively, such that there are V distinct hopping plans;
realized that a better balance between hardware cost (in terms of the number or receivers required, etc.) and the costs of synchronization complexity and operational overhead could be achieved by a third hopping scheme that can be described as a partial hopping-synchronization scheme.

At least some embodiments of the present invention provide methods and apparatus for wireless communication over an unlicensed spectrum between a central node and instances of an end node, respectively, using a partial hopping-synchronization scheme.

FIG. 1A is a block diagram of wireless network 100, for example, a long-range, low-power network, according to an embodiment of the present invention, wherein FIG. 1A emphasizes physical unit and functional unit configurations.

In FIG. 1A, wireless network 100 can be compatible with, e.g., the IEEE 802.15.4 standard, the LoRaWAN standard (as standardized by the LoRa™ Alliance), etc. For purposes of a more detailed discussion, at the physical layer, it will be assumed that wireless network 100 is compatible with the LoRa™ modulation format.

Network 100 includes: instances of end nodes 102; and a central node 106, e.g., a central gateway and/or a base station. Via wireless communication sessions 104, instances of end node 102 communicate with central node 106, respectively. As examples (and as will be discussed in more detail below, respectively), communications (in the downlink direction) from central node 106 to instances of end node 102 can include a beacon signal. Also as an example (and as will be discussed in more detail below), communications (in the uplink direction) from an instance of end node 102 to central node 106 can include a data message. Accordingly, instances of end node 102 can be described as message-sourceable.

In terms of physical components (as illustrated by exploded view 102'), each instance of end node 102 includes: one or more instances of a processor 108; memory 110 which itself includes one or more instances of non-volatile memory 112A and one or more instances of volatile memory 112B; and a wireless unit 114'. Also, in terms of physical components (as illustrated by exploded view 106'), each instance of central node 106 includes: one or more instances of a processor 116; memory 118 which itself includes one or more instances of non-volatile memory 120A and one or more instances of volatile memory 120B; and a wireless unit 122'. Additional details for the physical components are discussed relative to FIG. 1B (discussed below).

Each of wireless unit 122' and wireless unit 114' is configured to receive and transmit messages wirelessly, respectively. Overall, the physical components of central node 106 and of each instance of end node 102, respectively, are operable to engage in (among other things), e.g., LoRaWAN compatible, frequency modulated ("FM") chirp communication that is based on the generation of a stable chirp using a fractional-N ("fracN") phase-locked loop ("PLL") (the PLL not being illustrated). For example, the wireless transmissions can be performed in an unlicensed spectrum. Examples of unlicensed spectrums include the industrial, scientific and medical (ISM) radio bands reserved internationally for the use of radio frequency (RF) energy for industrial, scientific and medical purposes other than telecommunications, e.g., the 915 MHz ISM band as regulated in the U.S.A. by FCC Part 15, with such regulations including requirements/constraints on frequency hopping, etc.

Figure 1B:
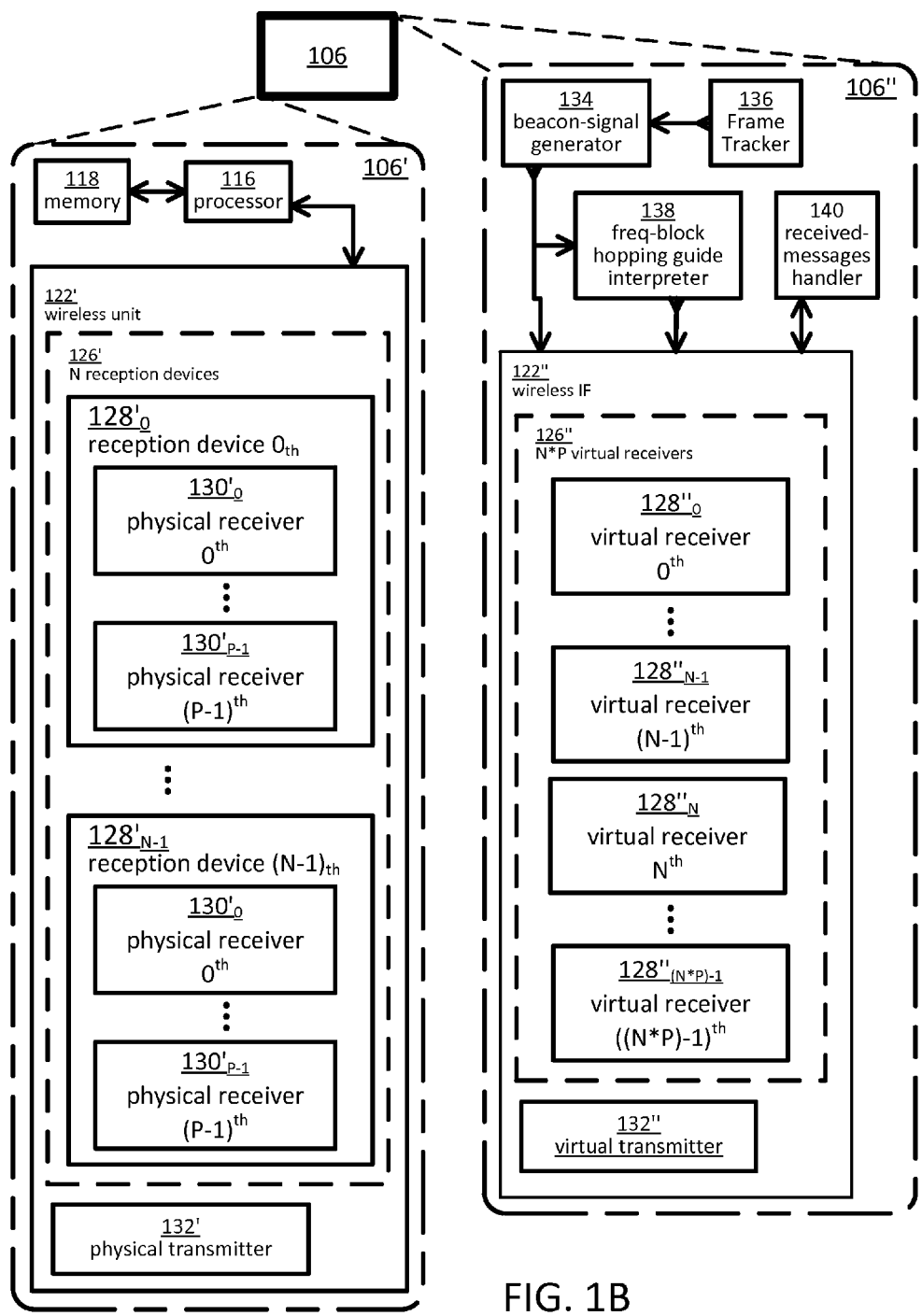
FIG. 1B is a block diagram illustrating the physical units and the functional units of a central node (e.g., the central node of FIG. 1A) in more detail, according to an embodiment of the present invention.

In terms of functional units (as illustrated by exploded view 102"), each instance of end node 102 includes: a wireless interface 114"; a frequency-block hopping guide interpreter 138; a channel selector 142; and a message generator 144. Also, in terms of functional units (as illustrated by exploded view 106"), the functional units of central node 106 are illustrated in FIG. 1B (discussed below). For each of central node 106 and a given instance of end node 102, such functional units can be implemented at least in part, e.g., as executable code stored in one or more of the memories thereof (noted above), with such code being executable by one or more of the processors (noted above), respectively. Such implementations can conform to the communication-layer diagram of FIG. 2 (discussed below).

FIG. 1B is a block diagram illustrating the physical units and the functional units of central node 106 in more detail, according to an embodiment of the present invention.

In FIG. 1B, in terms of the physical components (as illustrated by exploded view 106') included in each instance of central node 106, namely the one or more instances of a processor 116, memory 118 and a wireless unit 122', it is wireless unit 122' which is illustrated in more detail relative to FIG. 1B.

More particularly, FIG. 1B illustrates wireless interface 122' as including: a group 126' of N reception banks $128'_0$-$128'_{N-1}$, where N is an integer, and 2≤N. Each of the N reception banks $128'_0$-$128'_{N-1}$ in group 126' can include P physical receivers $130'_0$-$130'_{P-1}$, where P is a positive integer, 2≤P. For example, N=2 and P=4. Each of the P physical receivers $130'_0$-$130'_{P-1}$ can be tuned to any of the channels, CHs, e.g., available for uplink (that is, transmission in the direction from an instance of end node 102 to central node 106) in the given unlicensed spectrum. Recalling the assumption that, at maximum, there are Q channels which potentially can be used for transmissions (uplink direction) from instances of end node 102 to central node 106, it is noted that N*P<Q, i.e., that there are fewer receivers in central node 102 than there are channels which potentially can be used for uplink transmissions.

For example, each of the N reception banks $128'_0$-$128'_{N-1}$ being implemented by a Model SX1257 FR Front-End Transceiver commercially available from SEMTECH Corp. Also, for example, central node 106 can be a LoRa/SYMPHONY Gateway having, e.g., 8 channels (such as Model No. LL-BST-8 commercially available from LINK LABS, LLC).

Wireless unit 122' further includes at least one physical transmitter 132', e.g., corresponding to one of the transmitters in one of the Model SX1257 FR Front-End Transceivers. Here, an alternate term for channel CH is intermediate frequency, IF.

In FIG. 1B, in terms of the functional components (as illustrated by exploded view 106"), each instance of central node 106 includes: a group 126" of N*P virtual receivers $128"_0$, . . . , $128"_{N-1}$, $128"_N$, . . . , $128"_{N*P-1}$, where P is a positive integer, and 2≤P; a virtual transmitter 132"; a beacon signal generator 134; a frame tracker 136; a frequency-block hopping guide interpreter 138; and a received-messages handler 140.

Figure 2:
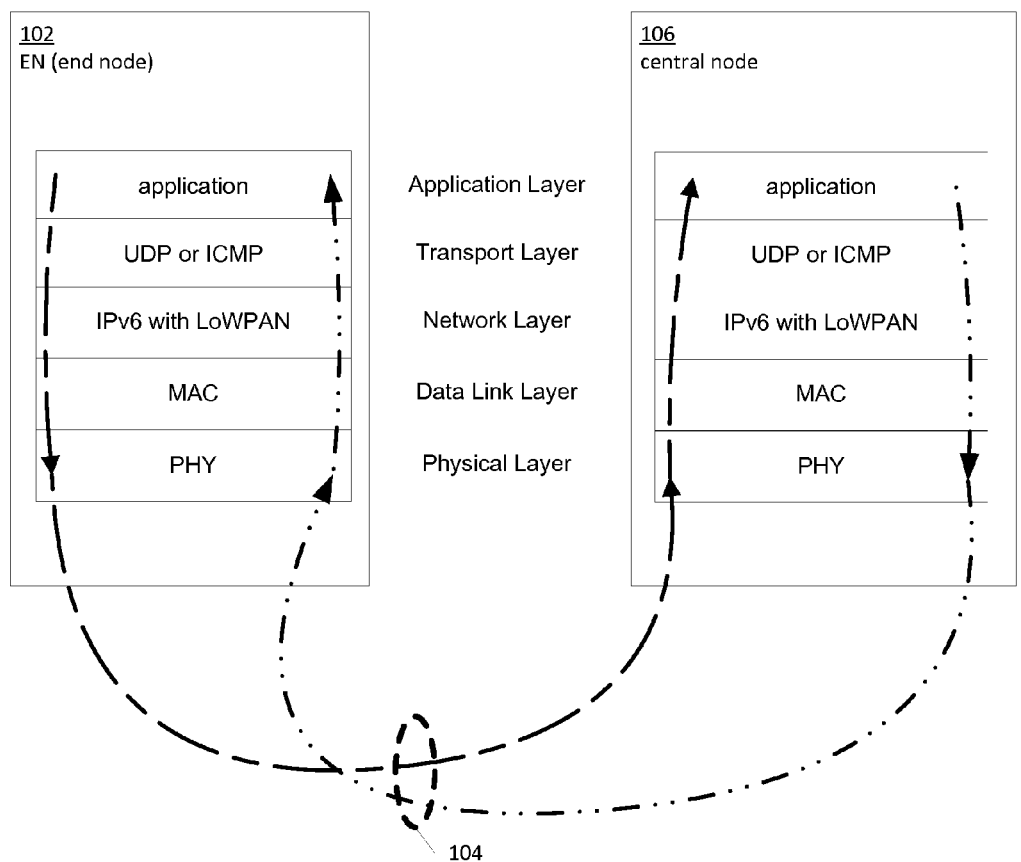
FIG. 2 is a communication-layer diagram illustrating the path of flow during an instance of a communication session between a central node and an instance of an end node, according to an embodiment of the present invention.

FIG. 2 is a communication-layer diagram illustrating the path of flow during an instance of communication session 104 between central node 106 and an instance of end node 102, according to an embodiment of the present invention.

Central node 106 and each instance of end node 102 can be implemented at least in part, e.g., as executable code stored in one or more of the noted (above) memories thereof and executed by one or more of the noted (above) processor units thereof, respectively. Such implementations can conform to the communication-layer diagram of FIG. 3.

More particularly, central node 106 and each instance of end node 102 can have a stack based (in part); on industry-standard layers. The layers illustrated in FIG. 2 represent but one example of combinations of layers that can be included in such stacks, respectively. Such layers, from bottom to top, for example (as illustrated in FIG. 2), can include: a physical layer; a data link (or MAC) layer; a network layer (e.g., an IP with LoWPAN) layer; a transport layer (e.g., a UDP layer or ICMP layer); and an application layer. Alternatively, different combinations of layers could be used in the stack.

Briefly, in operation, an instance of end node 102 can transmit messages to central node 106 as follows. Wireless unit 114' can be configured to receive (downlink direction) and transmit (uplink direction) messages. An instance of end node 102 (via wireless unit 114' and wireless interface 114") can receive (downlink direction), from central node 106, an instance of a non-hopping beacon signal, B, periodically-transmitted (e.g., at an interval of 2 sec or 0.5 Hz) from central node 106 (via wireless unit 122' and wireless interface 122"). Each instance B(i) of the beacon signal can include: a frame number, FN(i), of a frame corresponding thereto; and identification, IDCN, of central node 106. The IDCN does not necessarily need to be a unique identifier such as a GUID (Globally Unique Identifier)/UUID (Universally Unique Identifier). Rather, the IDCN should at least be unique among geographically neighboring (or co-located) instances of central node 106. For example, IDCN can be one of 16 different numbers.

Frequency-block hopping guide interpreter 138 can be configured to interpret a frequency-block hopping guide according to FN(i) and IDCN thereby to determine a corresponding set, CSET(i), of at least two channels available to the instance of end node 102 for transmission thereover (uplink direction), respectively, during frame FN(i). It is to be recalled: (A) that, at maximum, there is assumed to be Q channels which potentially can be used for transmissions (uplink direction) from instances of the end node 102 to central node 106; and (B) that central node is provided with N*P physical receivers, where N*P<Q.

With central node 106 having N*P<Q physical receivers, at least some hopping-synchronization is employed such that it would be inaccurate to describe the associated hopping-synchronization scheme as a zero synchronization scheme. Conversely, because central node 106 does not know on which (if any) of the N*P channels in CSET(i) there might be transmissions forthcoming from one of more of the instances of end node 102 during frame FN(i), consequently central node 106 must tune its N*P physical receivers to listen on all of the N*P channels in CSET(i), respectively. Hence, it would be inaccurate to describe the associated hopping-synchronization scheme as a complete synchronization scheme. Accordingly, the associated hopping-synchronization scheme can be described as a partial hopping-synchronization scheme.

The frequency-block hopping guide (also discussed in more detail below) establishes: a total of L frames; a set of channels CSET for each frame, respectively; and that, for any two consecutive ones of the L frames, FN(j) and FN(j+1), the corresponding sets CSET(j) and CSET(j+1) will be different, CSET(j)≠CSET(j+1). Channel selector 142 is configured to select, at least pseudo-randomly (albeit using a different pseudo random number generator than frequency-block hopping guide interpreter 138), at least one channel amongst the set CSET(i). Message generator 144 can be configured to generate at least one message using the at least one selected channel, respectively. Wireless interface 114" (via wireless unit 114') can be configured, among other things, to wirelessly transmit (uplink direction) the at least one message, respectively. It is noted that i and j are non-negative integers, L is an integer, and 2≤L, e.g., L=256.

Conversely (and, again, briefly), in operation, central node 106 can transmit (downlink direction) a beacon signal, B, to instances of end node 102, and then listen (uplink direction) for messages from the instances of end node 102, respectively, as follows. Frame tracker 136 can be configured to determine a frame number, FN(i). Beacon signal generator 134 can be configured to receive the frame number FN(i) and generate periodically an instance, B(i), of a non-hopping beacon signal B(i) which includes: the frame number, FN(i); and the identification, IDCN, of central node 106. For example, though the beacon signal is transmitted in an unlicensed spectrum, each instance B(i) of the beacon signal can be of sufficient bandwidth that it does not have to hop, i.e., it can be a non-hopping signal and yet be can be transmitted permissibly in the unlicensed spectrum because it is of sufficient bandwidth.

Wireless unit 122' can be configured to receive (uplink direction) and transmit (downlink direction) messages. Wireless interface 122" can be configured to transmit (downlink direction, via wireless unit 122') the instance B(i) of the beacon signal to the instances of end node 102, thereby starting an elapse of time corresponding to frame FN(i). As with the instances of end node 102, frequency-block hopping guide interpreter 138 can be configured to interpret a frequency-block hopping guide according to FN(i) and IDCN thereby to determine a corresponding set, CSET(i), of at least two channels available to the instance of end node 102 for transmission thereover, respectively, during frame FN(i). Also, as with the instances of end node 102, the frequency-block hopping guide (also discussed in more detail below) establishes: a total of L frames; a set of channels CSET for each frame, respectively; and that, for any two consecutive ones of the L frames, FN(j) and FN(j+1), the corresponding sets CSET(j) and CSET(j+1) will be different, CSET(j)≠CSET(j+1).

Wireless interface 122" can be further configured to listen (uplink direction, via group 126" that includes N*P virtual receivers 128"$_0$, ..., 128"$_{N-1}$, 128"$_N$, ..., 128"$_{N*P-1}$, where P is a positive integer, 2≤P, e.g., N=2 and P=4), during frame FN(i), on each of the at least two channels in the set CSET(i) for one or more transmissions (uplink direction) from instances of end nodes 102, respectively. Again, it is noted that i and j are non-negative integers, L is an integer, and 2≤L, e.g., L=256.

Each of central node 106 and the instances of end node 102 includes the same instance of frequency-block hopping guide interpreter 138. For example, at the time of manufacture, the same instance of frequency-block hopping specification 402 can be stored in memories 118 and 110 (e.g., non-volatile memories 120A and 112A) of central node 106 and the instances of end node 102, respectively. Upon initialization, the instances of frequency-block hopping guide interpreter 138 in central node 106 and the instances of end node 102, respectively, can generate corresponding instances of frequency-block hopping maps and/or frequency-block hopping schedules, respectively.

If central node 106 and the instances of end node 102 are synchronized, then manipulation of the same instance of frequency-block hopping specification 402 by processors 116 and 108 can generate the same corresponding instances of frequency-block hopping maps and/or frequency-block hopping schedules, respectively. Such synchronization can be provided, e.g., by the instances B(i) of the beacon signal that are transmitted periodically from central node 106 using the same channel/IF (again, the beacon signal is non-hopping), in particular by the instances FN(i) of the frame number included in the payloads of the instances B(i) of the beacon signal, respectively. Accordingly, when instances of frequency-block hopping guide interpreter 138 in central node 106 and the instances of end node 102 access their respective instances, e.g., of the frequency-block hopping schedules based on frame FN(i), such instances of frequency-block hopping guide interpreter 138 each will determine the same set CSET(i) of channels available for transmission thereover by the instances of end node 102 during frame FN(i).

Such synchronized generation of instances of frequency-block hopping maps and/or frequency-block hopping schedules includes the generation of pseudo-random numbers (see discussion of pseudo code example, below). Each of central node 106 and the instances of end node 102 includes the same instance of pseudo random number generator, e.g., a linear congruential generator, LCG. As a practical matter, the LCG is sufficiently deterministic that the resulting instances of frequency-block hopping maps and/or frequency-block hopping schedules will be the same, respectively. And yet the LCG is sufficiently pseudo random with respect to the numbers it generates that the resulting instances of frequency-block hopping maps and/or frequency-block hopping schedules will satisfy the hopping requirements, etc., promulgated for the given unlicensed spectrum by a government's regulatory authority.

So long as a given instance of end node 102 is connected to the same/first instance of central node 106, then its instances of frequency-block hopping map and/or frequency-block hopping schedule remain valid. If, however, the given instance of end node 102 that had been connected to the same/first instance of central node 106 becomes connected to a different/second instance of central node 106, then the given instance of end node 102 would need to regenerate its instances of frequency-block hopping map and/or frequency-block hopping schedule according to the corresponding identification IDCN of the different instance of central node 106.

Figure 3:
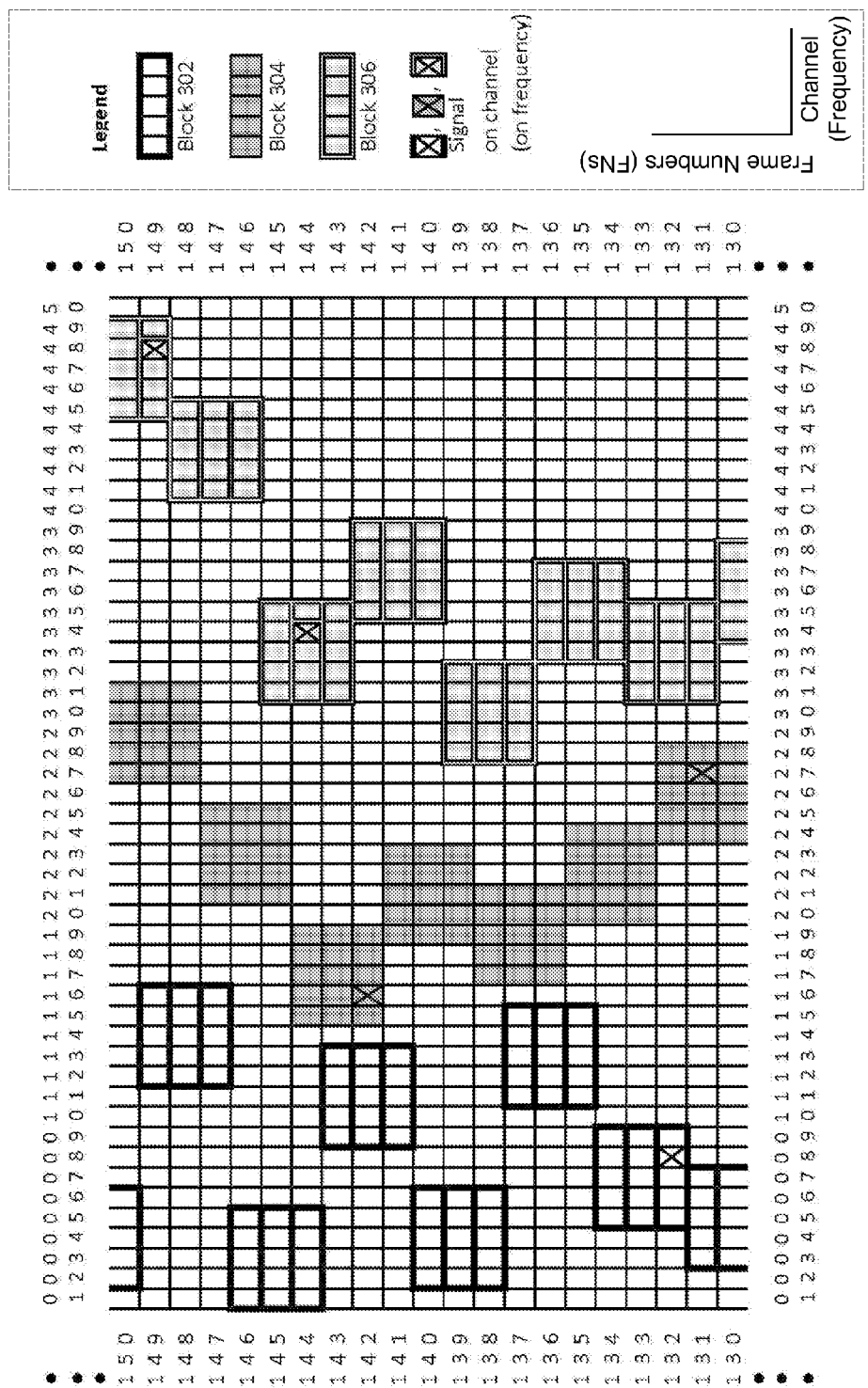
FIG. 3 is a two-dimensional plot illustrating an example of how blocks of contiguous frequencies hop from one frame to the next based on a frequency-block hopping guide, according to an embodiment of the present invention.

FIG. 3 is a two-dimensional plot illustrating an example of how blocks 302-306 of contiguous frequencies hop from one frame to the next based on a frequency-block hopping guide, according to an embodiment of the present invention.

In the example of FIG. 3, the X-axis represents uplink channels (to which contiguous intermediate frequencies ("IFs") correspond, respectively) while the Y-axis represents frame numbers. For simplicity, it has been assumed in FIG. 3 that there are only 50 uplink channels, i.e., Q=50. Again, this is merely an example as other values of Q are contemplated. Also for simplicity, only frames 130-150 have been illustrated in FIG. 3.

Also in the example of FIG. 3, it has been assumed that there are N=3 reception banks $128'_0$-$128'_2$ in group $126'$, with each of reception banks $128'_0$-$128'_2$ including P=5 physical receivers $130'_0$-$130'_4$, thereby providing a corresponding 15=3*5=N*P virtual receivers $128''_0, \ldots, 128''_{14}$ in group $126''$. Again, this is merely an example as other values for N and P are contemplated.

In frame 130, block 302 includes channels 03-07, block 304 includes channels 24-28 and block 306 includes channels 34-38 such that a channel set CSET(130) is {03-07,24-28,34-38}. It is noted that set CSET(130) represents the channels available to an instance of end node 102 for transmission thereover during frame FN(130), respectively.

In the next frame, namely frame 131, block 302 still includes channels 03-07 and block 304 still includes channels 24-28, but block 306 now includes channels 31-35 such that a channel set CSET(131) is {03-07,24-28,31-35}. It is noted that set CSET(130) represents the channels available to an instance of end node 102 for transmission thereover during frame FN(131), respectively. From frame 130 to frame 131, one block hops, namely block 306.

In frame 132, block 304 still includes channels 24-28 and block 306 still includes channels 31-35, but now block 302 includes channels 05-09 such that a channel set CSET(132) is {05-09,24-28,31-35}. From frame 131 to frame 132, one block hops, namely block 302. In frame 133, block 302 still includes channels 05-09 and block 306 still includes channels 31-35, but now block 304 includes channels 20-24 such that a channel set CSET(133) is {05-09,20-24,31-35}. From frame 132 to frame 133, one block hops, namely block 304. In frame 134, block 302 still includes channels 05-09 and block 304 still includes channels 20-24, but now block 306 includes channels 33-37 such that a channel set CSET(134) is {05-09, 20-24,33-37}. From frame 133 to frame 134, one block hops, namely block 306.

In FIG. 3, for any two consecutive ones of the frames, FN(j) and FN(j+1), channels comprising only one of the N=3 blocks, namely block $BK_H$, change between the corresponding sets CSET(j) and CSET(j+1) such that $BK_H(j) \neq BK_H(j+1)$. In other words, relative to frame 130 and set CSET(130), the hopping block $BK_H(131)$ for frame 131 and set CSET (131) is block 306. Relative to frame 131 and set CSET(131), the hopping block $BK_H(131)$ for frame 132 and set CSET (132) is block 302; relative to frame 132 and set CSET(132), the hopping block $BK_H(133)$ for frame 133 and set CSET (133) is block 304; relative to frame 133 and set CSET(133), the hopping block $BK_H(134)$ for frame 134 and set CSET (134) is block 306; etc.

Also in FIG. 3, it should be observed that each of blocks 302-306 stays the same for three frames and then changes on the fourth frame. In particular, in the range of frames 132-149, block 302 stays the same for frames 132-134, for frames 135-137, for frames 138-140, for frames 141-143, for frames 144-146 and for frames 147-149. In the range of frames 130-150, block 304 stays the same for frames 130-132, for frames 133-135, for frames 136-138, for frames 139-141, for frames 142-144, for frames 145-147 and for frames 148-150. In the range of frames 131-148, block 306 stays the same for frames 131-133, for frames 134-136, for frames 137-139, for frames 140-142, for frames 143-145 and for frames 146-148.

Though central node 106 listens on all of the available channels in a given set CSET(j) during a given frame FN(j), one or more messages are not necessarily transmitted from instances of end node 102 during FN(j). It should also be observed in FIG. 3 that most of the channels available during a given frame FN(j) go unused, i.e., do not experience a message being transmitted thereover from an instance of end node 102 to central node 106 while the latter listens. In FIG. 3, a message transmitted from an instance of end node 102 is indicated by an "X" appearing in a given channel for a given frame, namely {FN(j),CH(k)}. For example, it is assumed in FIG. 3 that messages are transmitted from an instances of end node 102 in {FN(j),CH(k)}={131,27}, {FN(j),CH(k)}= {132,08}, {FN(j),CH(k)}={142,16}, {FN(j),CH(k)}={144, 34} and {FN(j),CH(k)}={149,48}. By contrast, in frames FN(130), FN(133)-FN(141), FN(143), FN(145)-FN(148) and FN(150), no messages are transmitted from an instance of end node 102 to central node 106.

Figure 4:
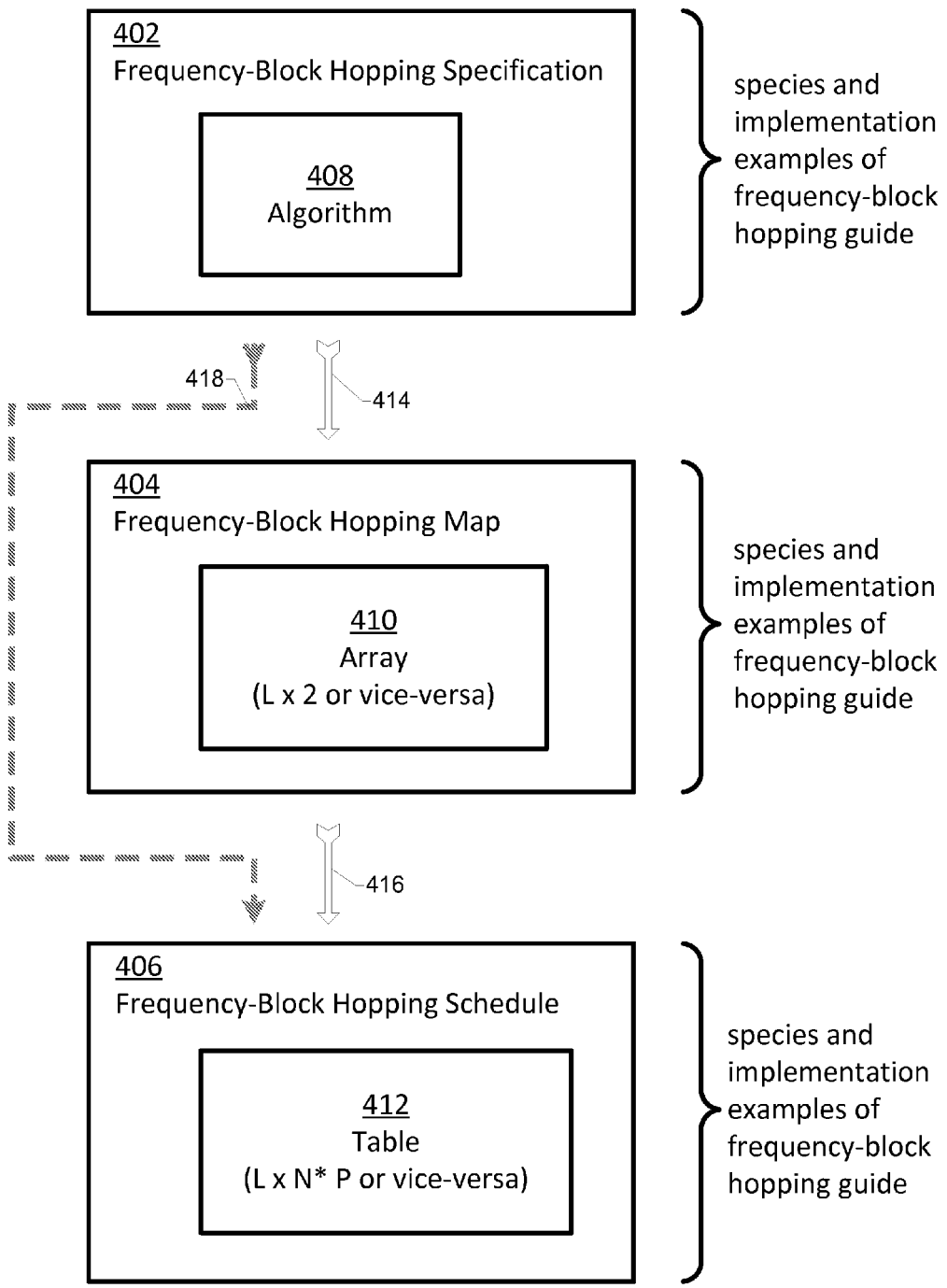
FIG. 4 is a block diagram illustrating species and implementation examples of a frequency-block hopping guide, plus derivational flow therebetween, respectively, according to an embodiment of the present invention.

FIG. 4 is a block diagram illustrating species examples and implementation examples of a frequency-block hopping guide, plus derivational flow therebetween, respectively, according to an embodiment of the present invention.

In FIG. 4, a first example species of a frequency-block hopping guide is a frequency-block hopping specification 402, of which an implementation example is an algorithm 408, e.g., in particular, pseudo code (discussed below). A second example species of a frequency-block hopping guide is a frequency-block hopping map 404, of which an implementation example is an array 410, e.g., in particular, an L×2 or 2×L array (discussed below). A third example species of a frequency-block hopping guide is a frequency-block hopping schedule 406, of which an implementation example is a table 412, e.g., in particular, a table having L rows and N*P columns or vice-versa (N*P rows and L columns) (discussed below). Again, these are merely examples as other species and implementation examples, respectively, are contemplated.

Frequency-block hopping map 404 can be derived from frequency-block hopping specification 402, as indicated by arrow 414 (and as discussed below). Frequency-block hopping schedule 406 can be derived from frequency-block hopping map 404, as indicated by arrow 416 (and as discussed below). In other words, frequency-block hopping schedule 406 can be derived indirectly from frequency-block hopping specification 402. Alternatively, frequency-block hopping schedule 406 can be derived directly from frequency-block hopping specification 402, as indicated by dashed arrow 418.

FIG. 5A is a particular implementation example of frequency-block hopping map 404 (which itself is a species of a frequency-block hopping guide), according to an embodiment of the present invention.

For FIG. 5A, the particular implementation example of frequency-block hopping map 404 is an L×2 array (data structure) 410 for which it is assumed that L=256. Again, this is merely an example as other values for L are contemplated. The hopping pattern prescribed by array 410 as the particular implementation example of hopping map 404 in FIG. 5A is cyclical. Upon reaching frame FN(L-1), the next frame is understood to be FN(0); for L=256, upon reaching FN(255), the next frame is FN(0).

It is noted that FIG. 5A also assumes: there are N=2 reception banks $128'_0$-$128'_1$ in group $126'$, with each of reception banks $128'_0$-$128'_1$ including P=4 physical receivers $130'_0$-$130'_3$, thereby providing a corresponding 8=2*4=N*P virtual receivers $128''_0, \ldots, 128''_7$ in group $126''$; each block of P=4 contiguous channels can be determined by designation of a root channel, $CH_R$, which in FIG. 5A is assumed to be the channel of lowest frequency in the block thereby determining a given block as $\{CH_R+0;CH_R+1;CH_R+2;CH_R+3\}$; there are 152 possible channels $\{0, \ldots, 151\}$ in the unlicensed spectrum of interest, of which 148=152-4 are root channel $CH_R$ candidates, with the maximum value of any channel being 151 and the maximum value of the root channel $CH_R$=148 else, e.g., if $CH_R$=149, then $\{CH_R+0;CH_R+1;CH_R+2;CH_R+3\}=\{149,150,151,152\}$, i.e., $CH_R+3$ would take on an illegal value of 152. Again, this is merely an example as other values for N and P are contemplated.

Illustrated in FIG. 5A is a particular implementation example of a frequency-block hopping map 404, namely an L×2 array 410, L=256. As noted above in the discussion above of FIG. 4, frequency-block hopping map 404 itself is a second example species of a frequency-block hopping guide.

For simplicity, the array in FIG. 5A has been illustrated as 8 instances of a 33×2 table (including the header row), with the first instance of the table corresponding to frame numbers FN(000) to FN(031), the second instance of the table corresponding to frame numbers FN(032) to FN(063), etc. In each of the tables in FIG. 5A, the left column represents the frame number FN(i) and the right column represents the root channel, $CH_R$, for the corresponding hopping block $BK_H$. Again, an alternate term for channel CH is intermediate frequency, IF, such that root channel $CH_R$ is equivalent to root IF, $IF_R$.

Again, each frame FN(j) has a corresponding set CSET(j) of channels available during frame FN(i) for transmission thereover (uplink) by instances of end node 102. For any two consecutive ones of the frames, FN(j) and FN(j+1), channels comprising only one of the N blocks (N=2 in FIG. 5A), namely block $BK_H$, change between the corresponding sets CSET(j) and CSET(j+1) such that $BK_H(j) \neq BK_H(j+1)$.

According to the example values in array 410 as the particular implementation example of frequency-block hopping map 404 illustrated in FIG. 5A, for map entry 035, map(035)= 64 such that for frame FN(035), $CH_R$=64; for map entry 074, map(074)=49 such that for frame FN(074), $CH_R$=49; for map entry 175, map(175)=110 such that for frame FN(175), $CH_R$=110; for map entry 219, map(219)=110 such that for frame FN(219), $CH_R$=112; etc.

Figure 5B:
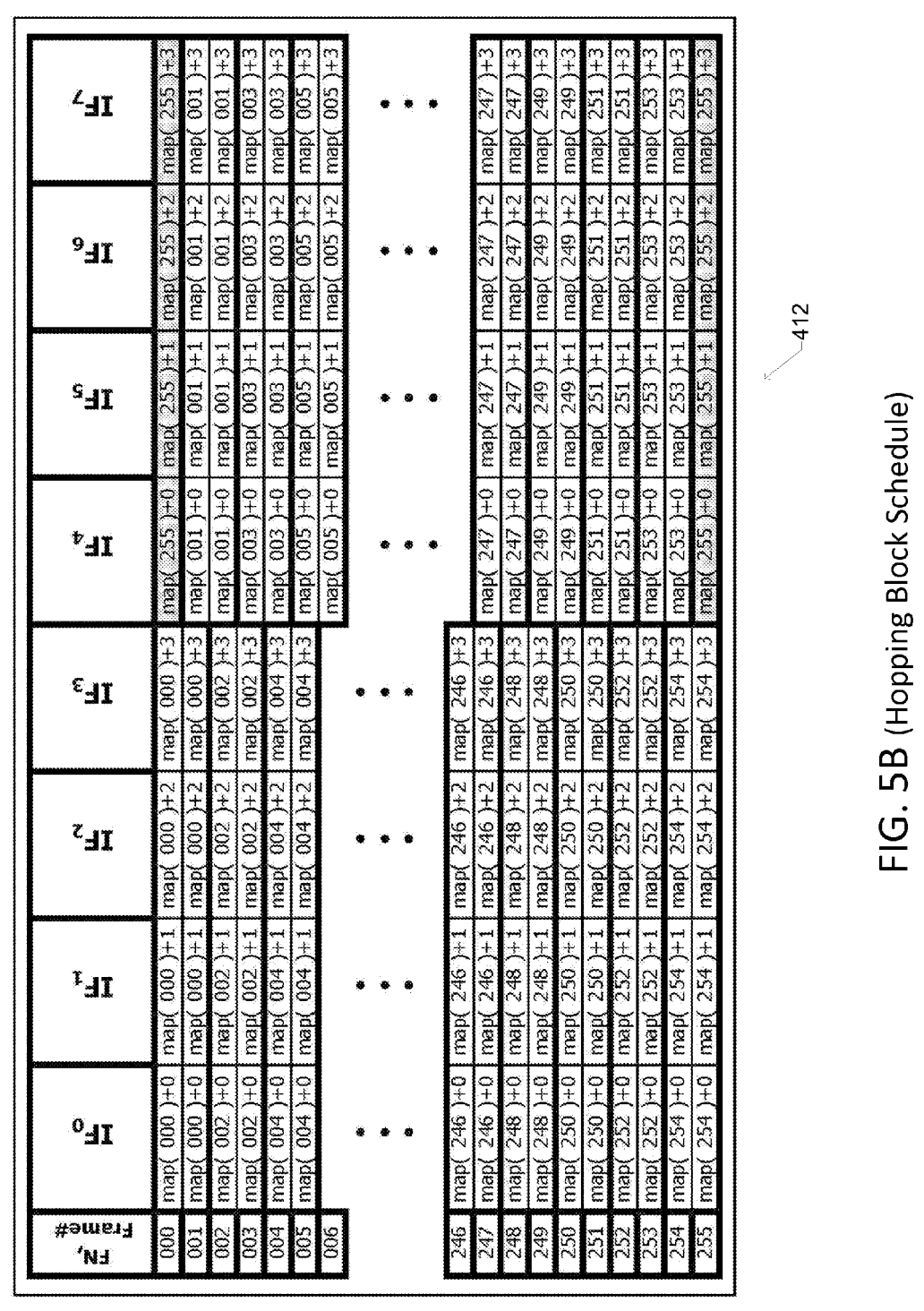

FIG. 5B is a particular implementation example of frequency-block hopping schedule 406 (which itself is a species of a frequency-block hopping guide), according to an embodiment of the present invention.

For FIG. 5B, the particular implementation example of frequency-block hopping schedule 406 is (L+1)×(N*P+1) table (data structure) 412 for which it is assumed that L=256. Again, this is merely an example as other values for L are contemplated. The hopping pattern prescribed by table 412 as the particular implementation example of hopping schedule 406 in FIG. 5B is cyclical. Upon reaching frame FN(L−1), the next frame is understood to be FN(0); for L=256, upon reaching FN(255), the next frame is FN(0).

It is noted that FIG. 5B (like FIG. 5A) also assumes: there are N=2 reception banks 128'$_0$-128'$_1$ in group 126', with each of reception banks 128'$_0$-128'$_1$ including P=4 physical receivers 130'$_0$-130'$_3$, thereby providing a corresponding 8=2*4=N*P virtual receivers 128"$_0$, …, 128"$_7$ in group 126"; each block of P=4 contiguous channels can be determined by designation of a root channel, $CH_R$, which in FIG. 5B is assumed to be the channel of lowest frequency in the block thereby determining a given block as $\{CH_R+0;CH_R+1;CH_R+2;CH_R+3\}$; there are Q=152 possible channels $\{0, \ldots, 151\}$ in the unlicensed spectrum of interest, of which 148=152-4 are root channel $CH_R$ candidates, with the maximum value of any channel being 151 and the maximum value of the root channel $CH_R$=148 else, e.g., if $CH_R$=149, then $\{CH_R+0;$ $CH_R+1;CH_R+2;CH_R+3\}=\{149,150,151,152\}$, i.e., $CH_R+3$ would take on an illegal value of 152. Again, this is merely an example as other values for Q, N and P are contemplated.

In FIG. 5B, other than the header row, each row in table 412 as the particular implementation example of frequency-block hopping schedule 406 lists a frame number and the corresponding set CSET, i.e., FN(j) and CSET(j), where $$CSET(j)=\{IF_R(BK(j,0))=IF_0,IF_1,IF_2,IF_3,IF_R(BK(j,1))=IF_4,IF_5,IF_6,IF_7\}.$$

Again, there are two blocks of channels/IFs that comprise CSET(j), with the first block BK(j,0) being $IF_0$, $IF_1$, $IF_2$ and $IF_3$ where $IF_0$ is the root channel/IF, $IF_R(BK(j,0))$, and with the second block BK(j,1) being $IF_4$, $IF_5$, $IF_6$ and $IF_7$ where $IF_1$ is the root channel/IF, $IF_R(BK(j,1))$.

Recalling that frequency-block hopping schedule 406 can be derived from frequency-block hopping map 404 (again, as indicated by arrow 416 in FIG. 4), for frame FN(000), table 412 as the particular implementation example of frequency-block hopping schedule 406 lists CSET(000)={$IF_R$(BK(000, 0))=$IF_0$=map(000)+0, $IF_1$=map(000)+1, $IF_2$=map(000)+2, $IF_3$=map(000)+3, $IF_R$(BK(000,1))=$IF_4$=map(255)+0, $IF_5$=map(255)+1, $IF_6$=map(255)+2, $IF_7$=map(255)+3}. Again, set CSET(000) represents the channels available to an instance of end node 102 for transmission thereover during frame FN(000), respectively.

In the next frame of schedule 412 of FIG. 5B, namely frame FN(001), CSET(001)={$IF_R$(BK(001,0))=$IF_0$=map(000)+0, $IF_1$=map(000)+1, $IF_2$=map(000)+2, $IF_3$=map(000)+3, $IF_R$(BK(001,1))=$IF_4$=map(001)+0, $IF_5$=map(001)+1, $IF_6$=map(001)+2, $IF_7$=map(001)+3}. From frame FN(000) to frame FN(001), one block hops, namely hopping block $BK_H$=BK(001,1) corresponding to the channels/IFs: $IF_R$(BK(001,1))= $IF_4$=map(001)+0; $IF_5$=map(001)+1; $IF_6$=map(001)+2; and $IF_7$=map(001)+3.

In frame FN(002) of schedule 412 of FIG. 5B, CSET(002)= {$IF_R$(BK(002,0))=$IF_0$=map(002)+0, $IF_1$=map(002)+1, $IF_2$=map(002)+2, $IF_3$=map(002)+3, $IF_R$(BK(002,1))=$IF_4$=map(001)+0, $IF_5$=map(001)+1, $IF_6$=map(001)+2, $IF_7$=map(001)+3}. From frame FN(001) to frame FN(002), one block hops, namely hopping block $BK_H$=BK(002,0) corresponding to the channels/IFs: $IF_R$(BK(002,0))=$IF_0$=map(002)+0; $IF_1$=map(002)+1; $IF_2$=map(002)+2; and $IF_3$=map(002)+3.

In frame FN(003) of schedule 412 of FIG. 5B, CSET(003)= {$IF_R$(BK(003,0))=$IF_o$=map(002)+0, $IF_1$=map(002)+1, $IF_2$=map(002)+2, $IF_3$=map(002)+3, $IF_R$(BK(003,1))= $IF_4$=map(003)+0, $IF_5$=map(003)+1, $IF_6$=map(003)+2, $IF_7$=map(003)+3}. From frame FN(002) to frame FN(003), one block hops, namely hopping block $BK_H$=BK(003,1) corresponding to the channels/IFs: $IF_R$(BK(003,1))=$IF_4$=map(003)+0; $IF_5$=map(003)+1; $IF_6$=map(003)+2; and $IF_7$=map(003)+3.

In frame FN(004) of schedule 412 of FIG. 5B, CSET(004)= {$IF_R$(BK(004,0))=$IF_o$=map(004)+0, $IF_1$=map(004)+1, $IF_2$=map(004)+2, $IF_3$=map(004)+3, $IF_R$(BK(004,1))= $IF_4$=map(003)+0, $IF_5$=map(003)+1, $IF_6$=map(003)+2, $IF_7$=map(003)+3}. From frame FN(003) to frame FN(004), one block hops, namely hopping block $BK_H$=BK(004,0) corresponding to the channels/IFs: $IF_R$(BK(004,0))=$IF_0$=map(004)+0; IF'=map(004)+1; $IF_2$=map(004)+2; and $IF_3$=map(004)+3.

Skipping ahead in schedule 412 of FIG. 5B, in frame FN(254), CSET(254)={$IF_R$(BK(254,0))=$IF_0$=map(254)+0, $IF_1$=map(254)+1, $IF_2$=map(254)+2, $IF_3$=map(254)+3, $IF_R$(BK(254,1))=$IF_4$=map(253)+0, $IF_5$=map(253)+1, $IF_6$=map(253)+2, $IF_7$=map(253)+3}. From frame FN(253) to frame FN(2544), one block hops, namely hopping block $BK_H$=BK (2544,0) corresponding to the channels/IFs: $IF_R$(BK(2544, 0))=$IF_0$=map(2544)+0; $IF_1$=map(2544)+1; $IF_2$=map(254)+2; and $IF_3$=map(254)+3.

In frame FN(255) of schedule 412 of FIG. 5B, CSET (255)= {$IF_R$(BK(255,0))=$IF_0$=map(254)+0, $IF_1$=map(254)+1, $IF_2$=map(254)+2, $IF_3$=map(254)+3, $IF_R$(BK(255,1))= $IF_4$=map(255)+0, $IF_5$=map(255)+1, $IF_6$=map(255)+2, $IF_7$=map(255)+3}. From frame FN(254) to frame FN(255), one block hops, namely hopping block $BK_H$=BK(255,1) corresponding to the channels/IFs: $IF_R$(BK(255,1))=$IF_4$=map (255)+0; $IF_5$=map(255)+1; $IF_6$=map(255)+2; and $IF_7$=map (255)+3}.

Frame FN(000) was discussed above. It is to be recalled that the hopping pattern prescribed by table 412 as the particular implementation example of hopping schedule 406 in FIG. 5B is cyclical. Upon reaching frame FN(L−1)=FN(255), the next frame is understood to be FN(000). Accordingly, from frame FN(255) to frame FN(000), one block hops, namely hopping block $BK_H$=BK(000,0) corresponding to the channels/IFs: $IF_R$(BK(000,0))=$IF_0$=map(000)+0; $IF_1$=map (000)+1; $IF_2$=map(000)+2; and $IF_3$=map(000)+3.

Also in FIG. 5B, because N=2, it should be observed that each of blocks BK(j,0) and BK(j,1) stays the same for two frames and then changes on the third frame. Alternatively, for example, if N=3 (as in FIG. 3), then there would be blocks BK(j,0), BK(j,1) and BK(j,2), and each of those blocks would stay the same for three frames and then change on the fourth frame. In other words, the number of frames during which a block BK(j,e) (where e∈{0,1, . . . , N−1} stays the same is dependent upon N.

Resuming discussion of the details of FIG. 5B, in the range of frames 000-005 and 246-255, BK(j,0) stays the same for frames 000-001, for frames 002-003, for frames 004-005, for frames 246-247, for frames 248-249, for frames 250-251, for frames 252-253 and for frames 254-255. In the range of frames 000-005 and 246-255, BK(j,1) stays the same for frames 001-002, for frames 003-004, for frames 005-006, for frames 247-248, for frames 249-250, for frames 251-252, for frames 253-254 and for frames 255-001.

Returning to FIG. 4, it is to be recalled that frequency-block hopping map 404 (a particular example of which is illustrated in FIG. 5A) can be derived from frequency-block hopping specification 402, as indicated by arrow 414. As noted, pseudo code is a particular implementation example of algorithm 408, with algorithm 408 being an implementation example of frequency-block hopping schedule 406 is algorithm 408, the latter being a species of frequency-block hopping guide. A yet more particular implementation example of algorithm 408 is the following example pseudo code.

| Pseudo code example: |
|---|
| ; >> assume L frames, where L is integer, 2 ≤ L;<br>; >> assume Q uplink channels;<br>; >> assume N reception banks where N is integer, 2 ≤ N;<br>; >> assume each bank has P contiguous channels;<br>; >> assume root channel, $CH_R$, amongst each instance of;<br>; P contiguous channels such that $CH_R$(bnk(i),FN(j)) denotes<br>; $CH_R$ for i$^{th}$ bank in j$^{th}$ frame, and such that, for a given block,<br>; there are P-1 other channels in addition to root channel $CH_R$; and<br>; such that, for the given block, the other P-1 channels can be<br>; determined based on the root channel $CH_R$;<br>Jump to pseudo code portion corresponding to value of IDCN;<br>Iterate over n, 0 ≤ n ≤ L − 1<br>  ; Determine which receiver bank to tune;<br>  BANK = n modulo N;<br>  Draw a pseudo random number s; |

| -continued |
|---|
| Pseudo code example: |
|   Generate $CH_R$(BANK,FN(n)) based on s and each of<br>    $CH_R$(BANK,FN(n-1)), ..., $CH_R$(BANK,FN(n-(N-1)));<br>  Check if $CH_R$(BANK,FN(n)) is acceptable, i.e., if<br>    $CH_R$(BANK,FN(n)) does not violate any of the following<br>    rules:<br>      $CH_R$(BANK,FN(n)) is different enough from each of<br>        $CH_R$(BANK,FN(n-1)), ..., $CH_R$(BANK,FN(n-(N-1))) to comply with hopping requirements<br>        for given unlicensed spectrum, and;<br>      $CH_R$(BANK,FN(n)) should be more than P channels<br>        away from $CH_R$(BANK,FN(n-1)), ...,<br>        $CH_R$(BANK,FN(n-(N-1)));<br>  If $CH_R$(BANK,FN(n)) is not acceptable, then loop to draw<br>    another pseudo random number;<br>  Else increment n and loop to next BANK; |

Figure 6A:
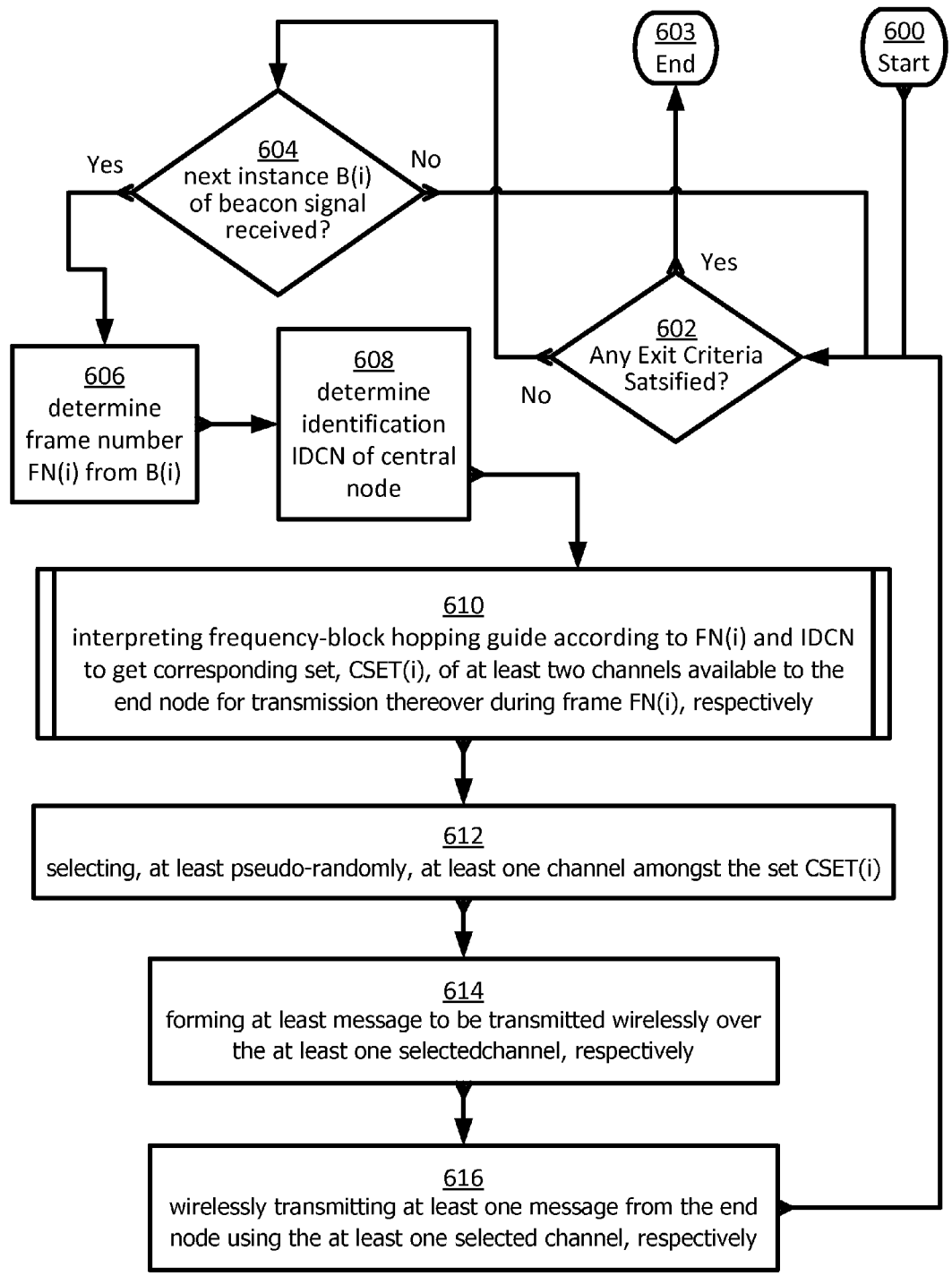
FIG. 6A is a flowchart illustrating a method of operating one instance of the end node to wirelessly communicate with the central node over an unlicensed spectrum, according to an embodiment of the present invention.

FIG. 6A is a flowchart illustrating a method of operating one instance of end node 102 to wirelessly communicate with central node 106 over an unlicensed spectrum, according to an embodiment of the present invention.

In FIG. 6A, there is a loop. As a general design consideration, no loop should be infinite, i.e., inescapable. Accordingly, flow in FIG. 6A starts at block 600 and proceeds to a decision block 602, where processor 108 decides if any exit criteria have been satisfied. If the outcome of decision block 602 is yes (one or more of the exit criteria are satisfied), then flow proceeds to block 603 and ends. If the outcome of decision block 602 is no (none of the exit criteria has been satisfied), then flow proceeds to a decision block 604.

At decision block 604, processor 108 determines if a next instance B(i) of the beacon signal has been received via wireless unit 114'. An instance of end node 102 (via wireless unit 114' and wireless interface 114") can receive (downlink direction) an instance of the non-hopping beacon signal B periodically-transmitted from central node 106. Each instance B(i) of the beacon signal can include: a frame number FN(i) of a frame corresponding thereto; and identification IDCN of central node 106.

If the outcome of decision block 604 is no (the next instance B(i) of the beacon signal has NOT been received), then processor 108 waits, e.g., then flow loops back to the input of decision block 602. If the outcome of decision block 604 is yes (the next instance of the beacon signal HAS been received), then flow proceeds to a block 606.

At block 606, frequency-block hopping guide interpreter 138 can determine FN(i) from the payload of B(i). From block 606, flow proceeds to a block 608, where frequency-block hopping guide interpreter 138 can determine identification IDCN of central node 106 from the payload of B(i). Like central node 106, each instance of end node 102 includes an instance of frequency-block hopping guide interpreter 138. From block 608, flow proceeds to block 610, where frequency-block hopping guide interpreter 138 can interpret a frequency-block hopping guide according to FN(i) and IDCN thereby to determine a corresponding set, CSET(i), of at least two channels available to the instance of end node 102 for transmission thereover (uplink direction), respectively, during frame FN(i). From block 610, flow proceeds to a block 612.

At block 612, channel selector 142 can select, at least pseudo-randomly (albeit using a different pseudo random number generator than frequency-block hopping guide interpreter 138), at least one channel amongst the set CSET(i). From block 612, flow proceeds to a block 614, where message generator 144 generates at least one message to be transmitted over the at least one selected channel, respectively. From block 614, flow proceeds to a block 616, where wireless interface 114" (via wireless unit 114') wirelessly transmits (uplink direction) the at least one message resulting in at least one current transmission TRANS(e), respectively. From block 616, flow loops back to decision block 602, discussed above.

In general (and among other things), in terms of channel separation between a current transmission TRANS(e) and the preceding transmission TRANS(e-1) (which could be from the preceding frame FN(i-1) or an older frame FN(i-2), etc.), a larger gap (channel-gap) is better than a smaller channel-gap. For example, the at least one channel amongst the set CSET(i) can be chosen so that the channel-gap between the current transmission TRANS(e) and the preceding transmission TRANS(e-1) will be at least M contiguous channels, where M is a positive integer, N<M (again, N being the number of blocks in the set of channels CSET(j)), and P<M (again, P being the number of channels in each of the N blocks).

Figure 6B:
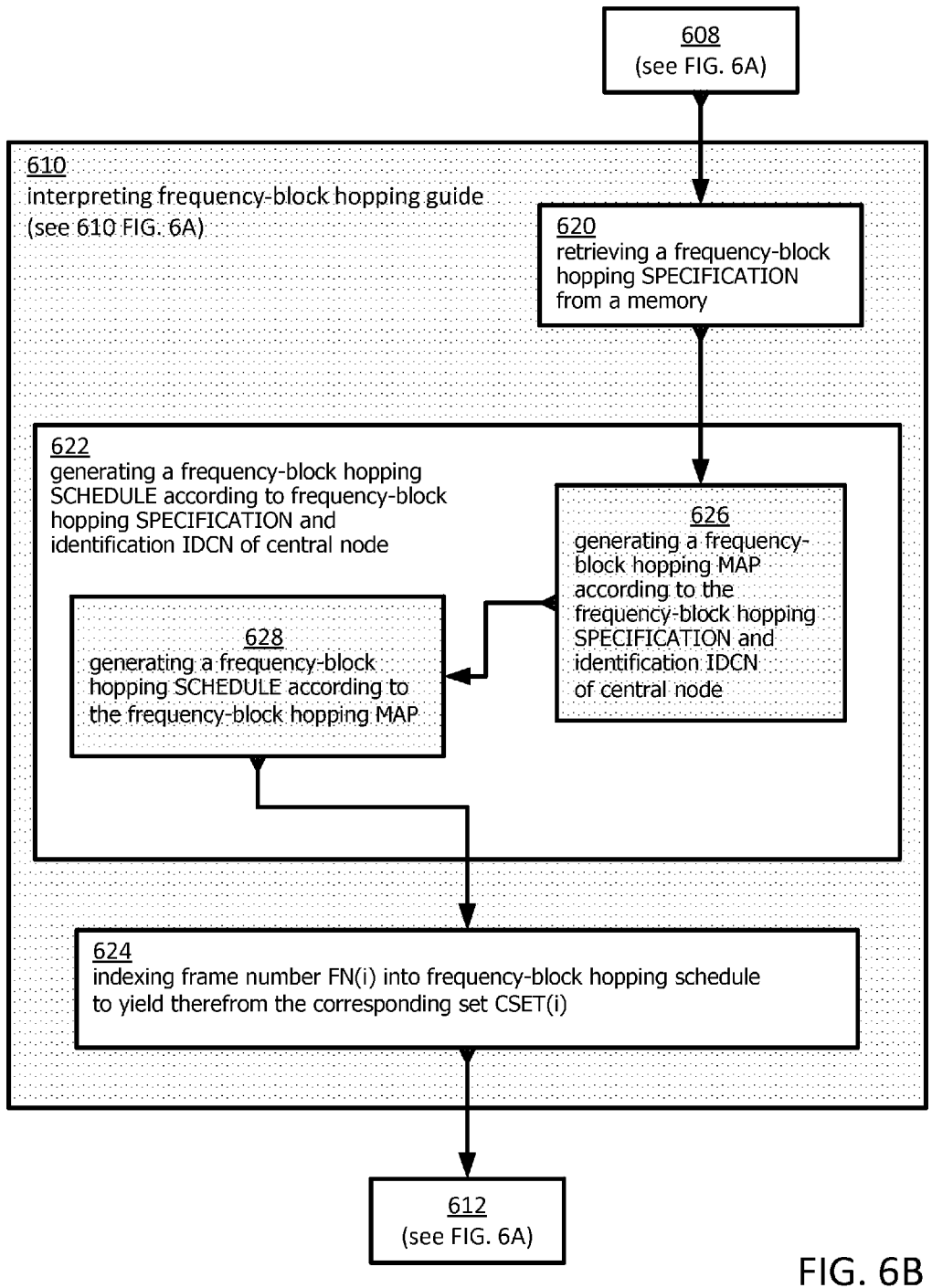
FIG. 6B is a flowchart illustrating a method of how an instance of the end node interprets a frequency-block hopping guide, according to an embodiment of the present invention.

FIG. 6B is a flowchart illustrating a method of how an instance of end node 102 interprets a frequency-block hopping guide, according to an embodiment of the present invention. More particularly, FIG. 6B provides details regarding flow inside block 610 of FIG. 6A.

In FIG. 6B, flow enters block 610 (from block 608 of FIG. 6A) and proceeds to a block 620, where processor 108 can retrieve a frequency-block hopping specification (e.g., block 402 of FIG. 2) from memory 110. From block 620, flow proceeds to a block 622, where processor 108 can generate a frequency-block hopping schedule (e.g., block 406 of FIG. 4) according to the frequency-block hopping specification and the identification IDCN of central node 106 (obtained at block 608 of FIG. 6A). Processor 108 can store the frequency-block hopping schedule in memory 110. From block 622, flow proceeds to a block 624.

At block 624, frequency-block hopping guide interpreter 138 can index the frame number FN(i) (obtained at block 606 of FIG. 6A) into the frequency-block hopping schedule to yield therefrom the corresponding set CSET(i). From block 624, flow leaves block 610 and proceeds to block 612 of FIG. 6A.

Upon proceeding from block 620 to block 622, flow can proceed within block 622 to a block 626, where processor 108 can generate a frequency-block hopping map (e.g., 404 of FIG. 4) based on the frequency-block hopping specification and the identification IDCN of central node 106. Processor 108 can store the frequency-block hopping map in memory 110. From block 626, flow can proceed to a block 628, where processor 108 can generate the frequency-block hopping schedule according to the frequency-block hopping specification. From block 628, flow leaves block 622 and proceeds to block 624, discussed above.

Figure 7A:
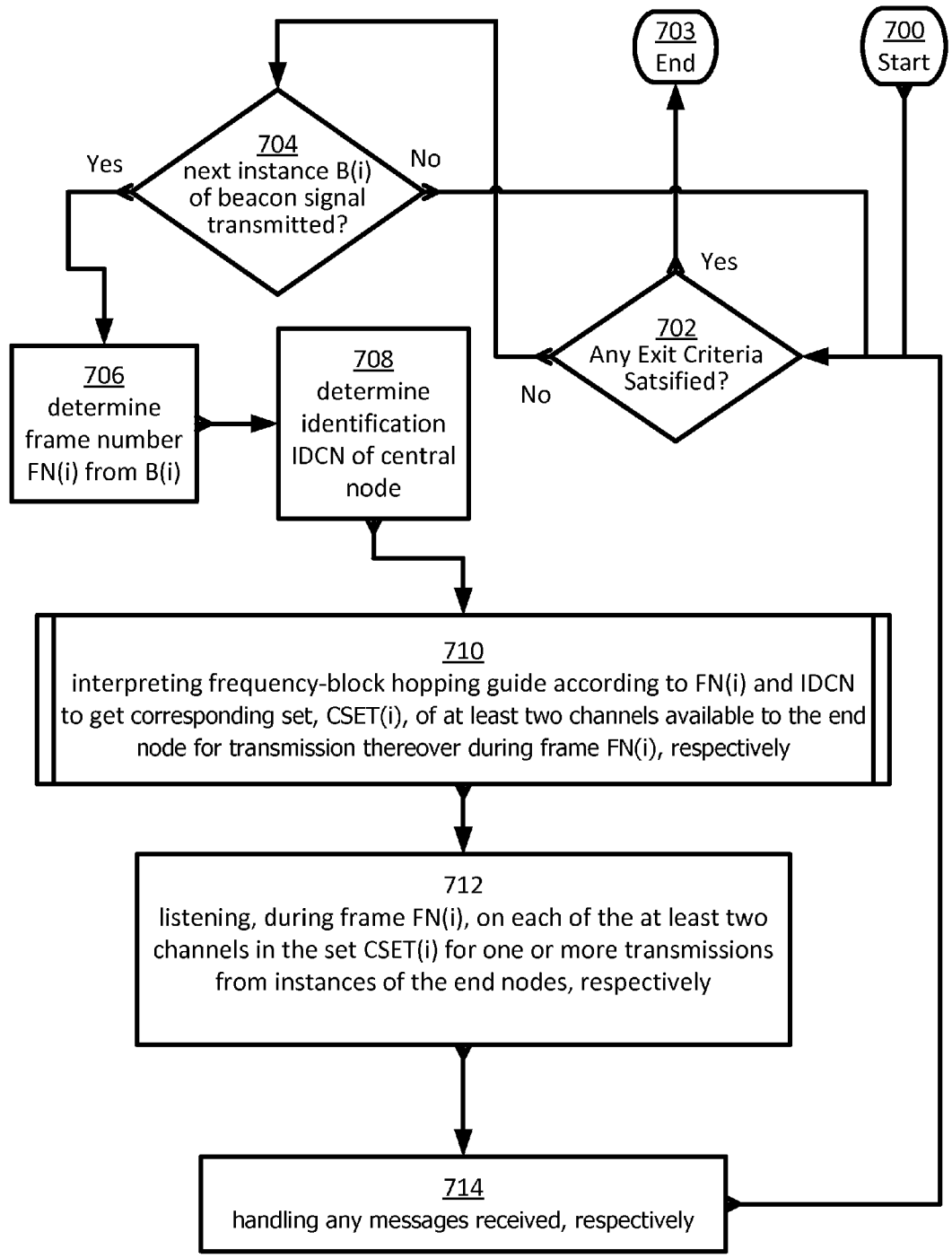
FIG. 7A is a flowchart illustrating a method of operating the central node to wirelessly communicate with instances of the end node over an unlicensed spectrum, according to an embodiment of the present invention.

FIG. 7A is a flowchart illustrating a method of operating central node 106 to wirelessly communicate with instances of end node 102 over an unlicensed spectrum, according to an embodiment of the present invention.

In FIG. 7A, there is a loop. As a general design consideration, no loop should be infinite, i.e., inescapable. Accordingly, flow in FIG. 7A, starts at block 700 and proceeds to a decision block 702, where processor 116 decides if any exit criteria have been satisfied. If the outcome of decision block 702 is yes (one or more of the exit criteria are satisfied), then flow proceeds to block 703 and ends. If the outcome of decision block 702 is no (none of the exit criteria has been satisfied), then flow proceeds to a decision block 704.

At decision block 704, processor 116 determines if a next instance B(i) of the beacon signal has been transmitted via wireless unit 122'. Central node 106 can transmit periodically (via wireless unit 122' and wireless interface 122") an instance of the non-hopping beacon signal B. Each instance B(i) of the beacon signal can include: a frame number FN(i) of a frame corresponding thereto; and identification IDCN of central node 106. Again, frame tracker 136 can be configured to determine a frame number, FN(i). Beacon signal generator 134 can be configured to receive the frame number FN(i) and generate periodically an instance, B(i), of a non-hopping beacon signal B(i) which includes: the frame number, FN(i); and the identification, IDCN, of central node 106.

If the outcome of decision block 704 is no (the next instance B(i) of the beacon signal has NOT been transmitted), then processor 116 waits, e.g., then flow loops back to the input of decision block 702. If the outcome of decision block 704 is yes (the next instance of the beacon signal HAS been received), then flow proceeds to a block 706.

At block 706, frequency-block hopping guide interpreter 138 can determine FN(i) from the payload of B(i). From block 706, flow proceeds to a block 708, where frequency-block hopping guide interpreter 138 can determine identification IDCN of central node 106 from the payload of B(i). Like each instance of end node 102, central node 106 includes an instance of frequency-block hopping guide interpreter 138. From block 708, flow proceeds to block 710, where frequency-block hopping guide interpreter 138 can interpret a frequency-block hopping guide according to FN(i) and IDCN thereby to determine a corresponding set, CSET(i), of at least two channels available to the instances of end node 102 for transmission thereover (uplink direction), respectively, during frame FN(i). From block 710, flow proceeds to a block 712.

At block 712, 128 wireless interface 122", in particular N*P virtual receivers $128"_0, \ldots, 128"_{N-1}, 128"_N, \ldots, 128"_{N*P-1}$, listens (uplink direction) during frame FN(i), on each of the at least two channels in the set CSET(i) for one or more transmissions (uplink direction) from instances of end nodes 102, respectively. From block 712, flow proceeds to a block 714, where received-messages handler 140 can handle any of the received messages. From block 714, flow loops back to decision block 702, discussed above.

Figure 7B:
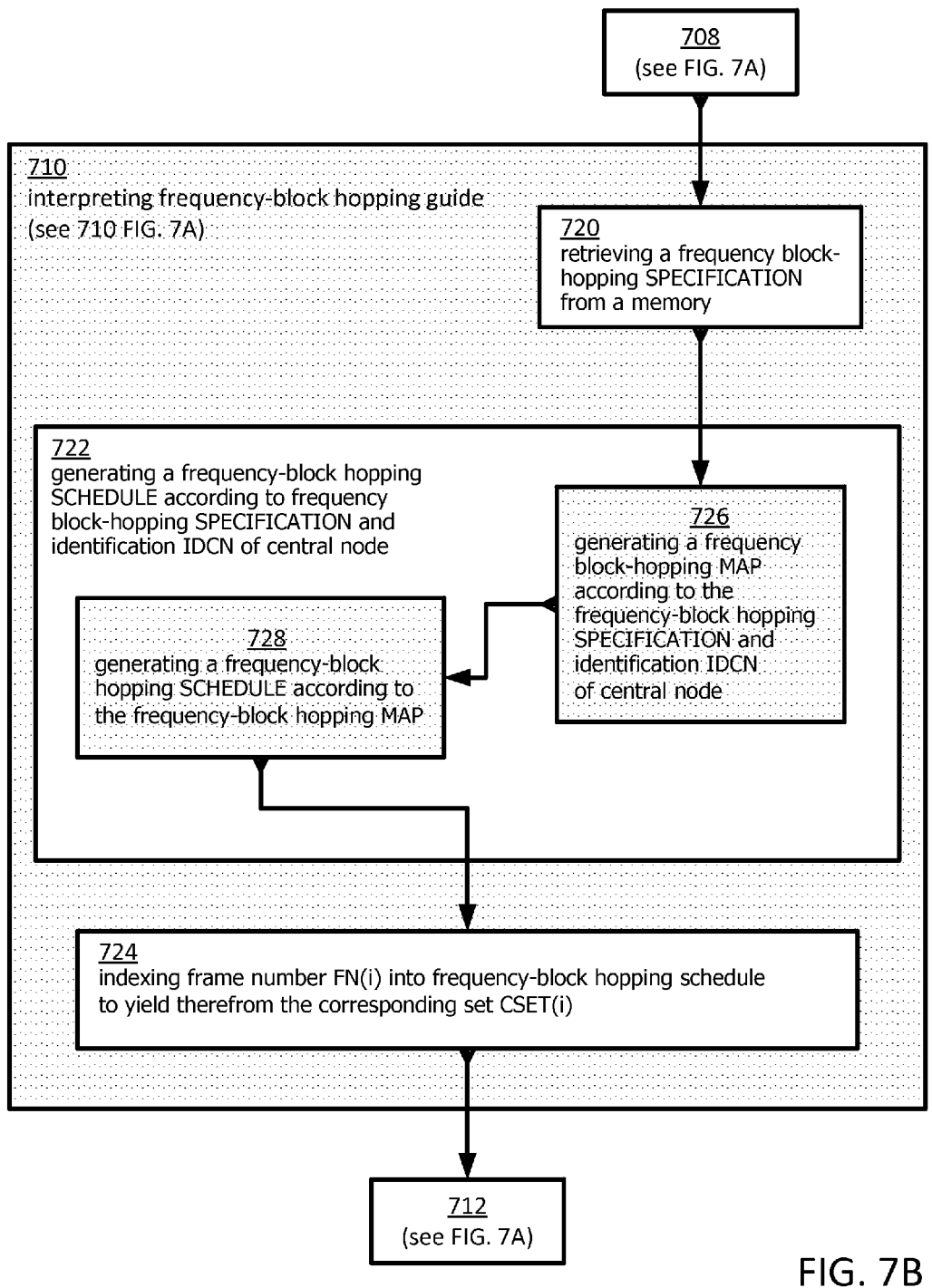
FIG. 7B is a flowchart illustrating a method of how the central node interprets a frequency-block hopping guide, according to an embodiment of the present invention.

FIG. 7B is a flowchart illustrating a method of how central node 106 interprets a frequency-block hopping guide, according to an embodiment of the present invention. More particularly, FIG. 7B provides details regarding flow inside block 710 of FIG. 7A.

In FIG. 7B, flow enters block 710 (from block 708 of FIG. 7A) and proceeds to a block 720, where processor 116 can retrieve a frequency-block hopping specification (e.g., block 402 of FIG. 2) from memory 118. From block 720, flow proceeds to a block 722, where processor 116 can generate a frequency-block hopping schedule (e.g., block 406 of FIG. 4) according to the frequency-block hopping specification and the identification IDCN of central node 106 (obtained at block 708 of FIG. 7A). Processor 116 can store the frequency-block hopping schedule in memory 118. From block 722, flow proceeds to a block 724.

At block 724, frequency-block hopping guide interpreter 138 can index the frame number FN(i) (obtained at block 706 of FIG. 7A) into the frequency-block hopping schedule to yield therefrom the corresponding set CSET(i). From block 724, flow leaves block 710 and proceeds to block 712 of FIG. 7A.

Upon proceeding from block 720 to block 722, flow can proceed within block 722 to a block 726, where processor 116 can generate a frequency-block hopping map (e.g., 404 of FIG. 4) based on the frequency-block hopping specification and the identification IDCN of central node 106. Processor 116 can store the frequency-block hopping map in memory 118. From block 726, flow can proceed to a block 728, where processor 116 can generate the frequency-block hopping schedule according to the frequency-block hopping specification. From block 728, flow leaves block 722 and proceeds to block 724, discussed above.

In the embodiments discussed above, for simplicity, it has been assumed that the P channels in each of the N blocks are contiguous. Alternatively, other groupings of the P channels in each of the N blocks are contemplated. For example, the P channels in each of the N blocks could be even sequential channels, odd sequential channels, etc.

Advantages of at least some, if not all, of the embodiments disclosed herein include: greater design flexibility because it is not necessary to provide Q receivers for Q uplink channels, rather N receivers are provided, where N<Q; a reduced amount of receiver re-tuning because only one bank of receivers (one block of frequencies included within the set of N frequency-blocks that comprise set CSET) re-tunes from one frame FN(j) to the next FN(j+1), which thereby reduces system downtime, increases capacity and relaxes the time synchronization constraints; interference mitigation, e.g., even active interference avoidance (cognitive radio); etc.

The present invention is not limited to the particular embodiments illustrated in the drawings and described above in detail. Those skilled in the art will recognize that other arrangements could be devised. The present invention encompasses every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application While the present invention has been described with reference to specific illustrative embodiments, modifications and variations of the present invention may be constructed without departing from the spirit and scope of the present invention as set forth in the following claims.

While the present invention has been described in the context of the embodiments explicitly discussed herein, those skilled in the art will appreciate that the present invention is capable of being implemented and distributed in the form of a computer-usable medium (in a variety of forms) containing computer-executable instructions, and that the present invention applies equally regardless of the particular type of computer-usable medium which is used to carry out the distribution. An exemplary computer-usable medium is coupled to a computer such the computer can read information including the computer-executable instructions therefrom, and (optionally) write information thereto. Alternatively, the computer-usable medium may be integral to the computer. When the computer-executable instructions are loaded into and executed by the computer, the computer becomes an apparatus for practicing the invention. For example, when the computer-executable instructions are loaded into and executed by a general-purpose computer, the general-purpose computer becomes configured thereby into a special-purpose computer. Examples of suitable computer-usable media include: volatile memory such as random access memory (RAM); non-volatile, hard-coded or programmable-type media such as read only memories (ROMs) or erasable, electrically programmable read only memories (EEPROMs); recordable-type and/or re-recordable media such as floppy disks, hard disk drives, compact discs (CDs), digital versatile discs (DVDs), etc.; and transmission-type media, e.g., digital and/or analog communications links such as those based on electrical-current conductors, light conductors and/or electromagnetic radiation.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. A method of operating one of a plurality of end nodes to communicate with a central node over an unlicensed spectrum, the method comprising:
    wirelessly receiving, an instance of a non-hopping beacon signal, B, periodically-transmitted from the central node;
    each instance B(i) of the beacon signal including:
        a frame number, FN(i), of a frame corresponding thereto; and
        an identification, IDCN, of the central node;
    interpreting a frequency-block hopping guide according to the frame number FN(i) and the identification IDCN thereby to determine a corresponding set, CSET(i), of at least two channels available to the end node for transmission thereover, respectively, during the frame number FN(i);
    wherein the frequency-block hopping guide establishes:
        a total of L frames;
        a set of channels CSET for each frame, respectively; and
        that, for any two consecutive ones of the L frames, FN(j) and FN(j+1), corresponding sets CSET(j) and CSET(j+1) will be different, CSET(j)≠CSET(j+1);
    selecting, at least pseudo-randomly, at least one channel amongst the corresponding set CSET(i); and
    wirelessly transmitting at least one message from the end node using the at least one selected channel, respectively;
    wherein i and j are non-negative integers, L is an integer and 2≤L.

2. The method of claim 1, wherein the frequency-block hopping guide, for any given frame FN(j), further establishes:
    a corresponding set of channels CSET(j) includes N blocks, 2≤N;
    each block in the corresponding set of channels CSET(j) includes P contiguous channels, 2≤P;
    each channel in the corresponding set of channels CSET(j) is a member of only one of the blocks of the corresponding set of channels CSET(j); and
    N and P are positive integers.

3. The method of claim 2, wherein the frequency-block hopping guide further establishes:
    how, for any two consecutive ones of the L frames, FN(j) and FN(j+1), channels comprising only one of the N blocks, block $BK_H$, change between the corresponding sets CSET(j) and CSET(j+1) such that $BK_H(j) \neq BK_H(j+1)$, thereby establishing how the block $BK_H$ hops between the corresponding sets CSET(j) and CSET(j+1).

4. The method of claim 2, wherein:
    the wirelessly transmitting the at least one message from the end node using the at least one selected channel results in at least one current transmission TRANS(e), respectively; and the selecting, at least pseudo-randomly, the at least one channel amongst the corresponding set CSET(i), includes:
  choosing at least one channel for the at least one current transmission TRANS(e) such that, in terms of channel separation, the at least one current transmission TRANS(e) hops across a gap of at least M contiguous channels relative to at least one previous transmission TRANS(e-1);
  wherein N<M, with N being the number of blocks in a given set of the corresponding set of channels CSET (j);
  wherein P<M, with P being the number of channels in each of the N blocks; and
  wherein M is a positive integer and e is a non-negative integer.

5. The method of claim 1, wherein the interpreting the frequency-block hopping guide includes:
  retrieving a frequency-block hopping specification from a memory;
  generating a frequency-block hopping schedule according to the frequency-block hopping specification and the identification IDCN of the central node; and
  indexing the frame number FN(i) into the frequency-block hopping schedule to yield therefrom the corresponding set CSET(i).

6. The method of claim 5, further comprising:
  generating a frequency-block hopping map based on the frequency-block hopping specification and the identification IDCN of the central node; and
  generating the frequency-block hopping schedule based on the frequency-block hopping map.

7. The method of claim 6, wherein:
  the frequency-block hopping guide, for any given frame FN(j), further establishes:
    a corresponding set of channels CSET(j) includes N blocks, 2≤N;
    each block in the corresponding set of channels CSET(j) includes P contiguous channels, 2≤P, such that there are N*P channels in the corresponding set of channels CSET(j);
    each channel in the corresponding set of channels CSET(j) is a member of only one of the blocks of the corresponding set of channels CSET(j); and
    N and P are positive integers;
  there are P contiguous P channels in each of the N blocks;
  there is a root channel, $CH_R$, amongst the contiguous P channels in each of the N blocks;
  for a given block, there are P-1 other channels in addition to the root channel, $CH_R$;
  for the given block, the other P-1 channels can be determined based on the root channel, $CH_R$;
  for any two consecutive ones of the L frames, FN(j) and FN(j+1), channels comprising only one of the N blocks, block $BK_H$, change between the corresponding sets CSET(j) and CSET(j+1) such that $BK_H(j) \neq BK_H(j+1)$, thereby establishing how the block $BK_H$ hops between the corresponding sets CSET(j) and CSET(j+1); and
  the generating the frequency-block hopping map includes:
    determining L instances of the root channel $CH_R$ corresponding to the L frames, respectively, and
    organizing the L instances of the root channel $CH_R$ into a data structure that identifies each of the same with corresponding L instances of the frame number FN(i), respectively, with the data structure being the frequency-block hopping map.

8. The method of claim 7, wherein the generating the frequency-block hopping schedule includes:
  organizing the L instances of the set of channels CSET into a data structure that identifies, for each of the L instances of the frame number FN(i), the N*P channels in the corresponding instance of the set of channels CSET, respectively, with the data structure being the frequency-block hopping schedule.

9. An end node configured to communicate with a central node over an unlicensed spectrum, the end node comprising:
  a wireless unit configured to receive and transmit messages, respectively;
  a wireless interface configured to receive, via the wireless unit, an instance of a non-hopping beacon signal, B, periodically-transmitted from the central node;
    each instance B(i) of the beacon signal including:
      a frame number, FN(i), of a frame corresponding thereto; and
      an identification, IDCN, of the central node; and
  an interpreter configured to interpret a frequency-block hopping guide according to the frame number FN(i) and the identification number IDCN thereby to determine a corresponding set, CSET(i), of at least two channels available to the end node for transmission thereover during the fame number FN(i), respectively;
  wherein the frequency-block hopping guide establishes:
    a total of L frames;
    a set of channels CSET for each frame, respectively; and
    that, for any two consecutive ones of the L frames, FN(j) and FN(j+1), corresponding sets CSET(j) and CSET(j+1) will be different, CSET(j)≠CSET(j+1); and
  a channel selector configured to select, at least pseudo-randomly, at least one channel amongst the corresponding set CSET(i); and
  a message generator configured to generate at least one message using the at least one selected channel, respectively; and
  wherein the wireless interface is further configured at least to transmit, via the wireless unit, at least one message using the at least one selected channel, respectively;
  wherein i and j are non-negative integers, L is an integer and 2≤L.

10. The end node of claim 9, wherein the frequency-block hopping guide, for any given frame FN(j), further establishes:
  a corresponding set of channels CSET(j) includes N blocks, 2≤N;
  each block in the corresponding set of channels CSET(j) includes P contiguous channels, 2≤P;
  each channel in the corresponding set of channels CSET(j) is a member of only one of the blocks of the corresponding set of channels CSET(j); and
  N and P are positive integers.

11. The end node of claim 10, wherein the frequency-block hopping guide further establishes:
  how, for any two consecutive ones of the L frames, FN(j) and FN(j+1), channels comprising only one of the N blocks, block $BK_H$, change between the corresponding sets CSET(j) and CSET(j+1) such that $BK_H(j) \neq BK_H(j+1)$, thereby establishing how the block $BK_H$ hops between the corresponding sets CSET(j) and CSET(j+1).

12. The end node of claim 10, wherein:
  the transmission by the wireless interface, via the wireless unit, of the at least one message using the at least one selected channel results in at least one current transmission TRANS(e), respectively; and the channel selector is further configured to at least:
choose at least one channel for the at least one current transmission TRANS(e) such that, in terms of channel separation, the at least one current transmission TRANS(e) hops across a gap of at least M contiguous channels relative to at least one previous transmission TRANS(e-1);
wherein N<M, with N being the number of blocks in a given set of the corresponding set of channels CSET (j);
wherein P<M, with P being the number of channels in each of the N blocks; and
wherein M is a positive integer and e is a non-negative integer.

13. The end node of claim 9, wherein the end node further comprises:
a memory; and
wherein the interpreter is further configured, at the least, to do the following:
retrieve a frequency-block hopping specification from the memory;
generate a frequency-block hopping schedule according to the frequency-block hopping specification and the identification IDCN of the central node; and
index the frame number FN(i) into the frequency-block hopping schedule to yield therefrom the corresponding set CSET(i).

14. The end node of claim 13, wherein the interpreter is further configured, at the least, to do the following:
generate a frequency-block hopping map based on the frequency-block hopping specification and the identification IDCN of the central node; and
generate the frequency-block hopping schedule based on the frequency-block hopping map.

15. The end node of claim 14, wherein:
the frequency-block hopping guide, for any given frame FN(j), further establishes:
a corresponding set of channels CSET(j) includes N blocks, $2 \leq N$;
each block in the corresponding set of channels CSET(j) includes P contiguous channels, $2 \leq P$, such that there are N*P channels in the corresponding set of channels CSET(j);
each channel in the corresponding set of channels CSET(j) is a member of only one of the blocks of the corresponding set of channels CSET(j); and
N and P are positive integers;
there are P contiguous P channels in each of the N blocks;
there is a root channel, $CH_R$, amongst the contiguous P channels in each of the N blocks;
for a given block, there are P-1 other channels in addition to the root channel, $CH_R$;
for the given block, the other P-1 channels can be determined based on the root channel, $CH_R$;
for any two consecutive ones of the L frames, FN(j) and FN(j+1), channels comprising only one of the N blocks, block $BK_H$, change between the corresponding sets CSET(j) and CSET(j+1) such that $BK_H(j)$ $BK_H(j+1)$, thereby establishing how the block $BK_H$ hops between the corresponding sets CSET(j) and CSET(j+1); and
the interpreter is further configured, at the least, to do the following:
determine L instances of the root channel $CH_R$ corresponding to the L frames, respectively, and
organize the L instances of the root channel $CH_R$ into a data structure that identifies each of the same with corresponding L instances of the frame number FN(i), respectively, with the data structure being the frequency-block hopping map.

16. The end node of claim 15, wherein the interpreter is further configured, at the least, to do the following:
organize the L instances of the set of channels CSET into a data structure that identifies, for each of the L instances of the frame number FN(i), the N*P channels in the corresponding instance of the set of channels CSET, respectively, with the data structure being the frequency-block hopping schedule.

17. A method of operating a central node to wirelessly communicate with instances of an end node, the method comprising:
determining a frame number, FN(i);
generating periodically an instance, B(i), of a non-hopping beacon signal which includes:
the frame number, FN(i); and
an identification, IDCN, of the central node;
transmitting the instance B(i) of the beacon signal to the instances of the end node thereby starting an elapse of time corresponding to the frame number FN(i);
interpreting a frequency-block hopping guide according to the frame number FN(i) and the identification IDCN thereby to determine a corresponding set, CSET(i), of at least two channels available to the instances of the end node for transmission thereover, respectively, during the frame number FN(i);
wherein the frequency-block hopping guide establishes:
a total of L frames;
a set of channels CSET for each frame, respectively; and
that, for any two consecutive ones of the L frames, FN(j) and FN(j+1), corresponding sets CSET(j) and CSET(j+1) will be different, CSET(j)*CSET(j+1); and
listening, during the frame number FN(i), on each of the at least two channels in the corresponding set CSET(i) for one or more transmissions from one or more of the instances of the end nodes, respectively;
wherein i and j are non-negative integers, L is an integer and $2 \leq L$.

18. The method of claim 17, wherein the frequency-block hopping guide, for any given frame FN(j), further establishes:
a corresponding set of channels CSET(j) includes N blocks, $2 \leq N$;
each block in the corresponding set of channels CSET(j) includes P contiguous channels, $2 \leq P$;
each channel in the corresponding set of channels CSET(j) is a member of only one of the blocks of the corresponding set of channels CSET(j); and
N and P are positive integers.

19. The method of claim 18, wherein the frequency-block hopping guide further establishes:
how, for any two consecutive ones of the L frames, FN(j) and FN(j+1), channels comprising only one of the N blocks, block $BK_H$, change between the corresponding sets CSET(j) and CSET(j+1) such that $BK_H(j) \neq BK_H(j+1)$, thereby establishing how the block $BK_H$ hops between the corresponding sets CSET(j) and CSET(j+1).

20. The method of claim 17, wherein the interpreting a frequency-block hopping guide includes:
retrieving a frequency-block hopping specification from a memory;
generating a frequency-block hopping schedule according to the frequency-block hopping specification and the identification IDCN of the central node; and indexing the frame number FN(i) into the frequency-block hopping schedule to yield therefrom the corresponding set CSET(i).

21. The method of claim 20, wherein:
generating a frequency-block hopping map based on the frequency-block hopping specification and the identification IDCN of the central node; and
generating the frequency-block hopping schedule based on the frequency-block hopping map.

22. The method of claim 21, wherein:
the frequency-block hopping guide, for any given frame FN(j), further establishes:
a corresponding set of channels CSET(j) includes N blocks, 2≤N;
each block in the corresponding set of channels CSET(j) includes P contiguous channels, 2≤P, such that there are N*P channels in the corresponding set of channels CSET(j);
each channel in the corresponding set of channels CSET(j) is a member of only one of the blocks of the corresponding set of channels CSET(j); and
N and P are positive integers;
there are P contiguous P channels in each of the N blocks;
there is a root channel, $CH_R$, amongst the contiguous P channels in each of the N blocks;
for a given block, there are P-1 other channels in addition to the root channel, $CH_R$;
for the given block, the other P-1 channels can be determined based on the root channel, $CH_R$;
for any two consecutive ones of the L frames, FN(j) and FN(j+1), channels comprising only one of the N blocks, block $BK_H$, change between the corresponding sets CSET(j) and CSET(j+i) such that $BK_H(j) \neq BK_H(j+i)$, thereby establishing how the block $BK_H$ hops between the corresponding sets CSET(j) and CSET(j+i); and
the generating a frequency-block hopping map includes:
determining L instances of the root channel $CH_R$ corresponding to the L frames, respectively, and
organizing the L instances of the root channel $CH_R$ into a data structure that identifies each of the same with corresponding L instances of the frame number FN(i) respectively, with the data structure being the frequency-block hopping map.

23. The method of claim 22, wherein the generating the frequency-block hopping schedule includes:
organizing the L instances of the set of channels CSET into a data structure that identifies, for each of the L instances of the frame number FN(i), the N*P channels in the corresponding instance of the set of channels CSET, respectively, with the data structure being the frequency-block hopping schedule.

24. A central node configured to wirelessly communicate with instances of an end node, the central node comprising:
a frame tracker configured to determine a frame number, FN(i);
a beacon-signal generator configured to generate periodically an instance, B(i), of a non-hopping beacon signal which includes:
the frame number, FN(i); and
an identification, IDCN, of the central node;
a wireless unit, including at least two receivers, configured to receive and transmit messages, respectively;
a wireless interface configured to transmit, via the wireless unit, the instance B(i) of the beacon signal to the instances of the end node thereby starting an elapse of time corresponding to the frame number FN(i); and
an interpreter configured to interpret a frequency-block hopping guide according to the frame number FN(i) and the identification IDCN thereby to determine a corresponding set, CSET(i), of at least two channels available to the instances of the end node for transmission thereover, respectively, during the frame number FN(i);
wherein the frequency-block hopping guide establishes:
at total of L frames;
a set of channels CSET for each frame, respectively; and
that, for any two consecutive ones of the L frames, FN(j) and FN(j+1), corresponding sets CSET(j) and CSET(j+1) will be different, CSET(j)≠CSET(j+1);
wherein the wireless interface is further configured to listen via the at least two receivers, during the frame number FN(i), on each of the at least two channels in the corresponding set CSET(i) for one or more transmissions from one or more of the instances of the end nodes, respectively;
wherein i and j are non-negative integers, L is an integer and 2≤L.

25. The central node of claim 24, wherein the frequency-block hopping guide, for any given frame FN(j), further establishes:
a corresponding set of channels CSET(j) includes N blocks, 2≤N;
each block in the corresponding set of channels CSET(j) includes P contiguous channels, 2≤P;
each channel in the corresponding set of channels CSET(j) is a member of only one of the blocks of the corresponding set of channels CSET(j); and
N and P are positive integers.

26. The central node of claim 25, wherein the frequency-block hopping guide further establishes:
how, for any two consecutive ones of the L frames, FN(j) and FN(j+1), channels comprising only one of the N blocks, block $BK_H$, change between the corresponding sets CSET(j) and CSET(j+1) such that $BK_H(j) \neq BK_H(j+1)$, thereby establishing how the block $BK_H$ hops between the corresponding sets CSET(j) and CSET(j+1).

27. The central node of claim 24, wherein the central node further comprises:
a memory; and
wherein the interpreter is further configured, at the least, to do the following:
retrieve a frequency-block hopping specification from the memory;
generate a frequency-block hopping schedule according to the frequency-block hopping specification and the identification IDCN of the central node; and
index the frame number FN(i) into the frequency-block hopping schedule to yield therefrom the corresponding set CSET(i).

28. The central node of claim 27, wherein the interpreter is further configured, at the least, to do the following:
generate a frequency-block hopping map based on the frequency-block hopping specification and the identification IDCN of the central node; and
generate the frequency-block hopping schedule based on the frequency-block hopping map.

29. The central node of claim 28, wherein:
the frequency-block hopping guide, for any given frame FN(j), further establishes:
a corresponding set of channels CSET(j) includes N blocks, 2≤N;

each block in the corresponding set of channels CSET(j) includes P contiguous channels, 2≤P, such that there are N*P channels in the corresponding set of channels CSET(j);

each channel in the corresponding set of channels CSET(j) is a member of only one of the blocks of the corresponding set of channels CSET(j); and N and P are positive integers;

there are P contiguous P channels in each of the N blocks;

there is a root channel, $CH_R$, amongst the contiguous P channels in each of the N blocks;

for a given block, there are P-1 other channels in addition to the root channel, $CH_R$;

for the given block, the other P-1 channels can be determined based on the root channel, $CH_R$;

for any two consecutive ones of the L frames, FN(j) and FN(j+1), channels comprising only one of the N blocks, block $BK_H$, change between the corresponding sets CSET(j) and CSET(j+1) such that $BK_H(j) \neq BK_H(j+1)$, thereby establishing how the block $BK_H$ hops between the corresponding sets CSET(j) and CSET(j+1); and the interpreter is further configured, at the least, to do the following:
    determine L instances of the root channel $CH_R$ corresponding to the L frames, respectively, and
    organize the L instances of the root channel $CH_R$ into a data structure that identifies each of the same with corresponding L instances of the frame number FN(i), respectively, with the data structure being the frequency-block hopping map.

30. The central node of claim 29, wherein the interpreter is further configured, at the least, to do the following:
    organize the L instances of the set of channels CSET into a data structure that identifies, for each of the L instances of the frame number FN(i), the N*P channels in the corresponding instance of the set of channels CSET, respectively, with the data structure being the frequency-block hopping schedule.

* * * * *